United States Patent [19]
Dancs et al.

[11] Patent Number: 6,112,305
[45] Date of Patent: Aug. 29, 2000

[54] MECHANISM FOR DYNAMICALLY BINDING A NETWORK COMPUTER CLIENT DEVICE TO AN APPROVED INTERNET SERVICE PROVIDER

[75] Inventors: Frank B. Dancs, Hillsborough; James E. Zmuda, Foster City, both of Calif.

[73] Assignee: Liberate Technologies, San Carlos, Calif.

[21] Appl. No.: 09/073,271

[22] Filed: May 5, 1998

[51] Int. Cl.[7] ............................................. H04L 9/00
[52] U.S. Cl. .................. 713/156; 713/155; 713/161; 713/168; 380/255; 380/258
[58] Field of Search .................... 380/255, 258; 713/161, 168, 170, 172, 173, 176, 156, 155

[56] References Cited

U.S. PATENT DOCUMENTS

| | | | |
|---|---|---|---|
| 5,784,463 | 7/1998 | Chen et al. | 380/21 |
| 5,805,803 | 9/1998 | Birrell et al. | 395/187.01 |
| 5,857,024 | 1/1999 | Nishino et al. | 380/25 |
| 5,864,667 | 1/1999 | Barkan | 395/187.01 |
| 5,903,721 | 5/1999 | Sixtus | 395/187.01 |

*Primary Examiner*—Thomas R. Peeso
*Attorney, Agent, or Firm*—Fliesler, Dubb, Meyer & Lovejoy

[57] ABSTRACT

All network computer client device (NC) manufacturers' authorizations to connect to specific internet service providers (ISPs) are maintained in a central database associated with a relationship server. The relationship server issues digital certificates which associate various ISPs to their respective public keys. Each ISP is assigned a unique enterprise identification number by the relationship server. To authorize a specific ISP, the manufacturer begins with the relationship server's ISP certificate. The manufacturer computes and appends its own digital signature for the relationship server's ISP certificate, thereby creating an ISP usage certificate valid for its NCs which it sends back to the relationship server. Upon first powering on, each NC dials the relationship server and transmits its manufacturer identification number. The relationship server uses the manufacturer identification number to find the ISP usage certificates corresponding to the NC manufacturer. The relationship server then sends to the NC the ISP usage certificate corresponding to the enterprise identification number, or corresponding to the user's selection if no enterprise identification number on the smart card is established. The NC performs a cryptographic verification of the ISP usage certificate using the manufacturer's public key which is permanently stored in the NC in read only memory. Only if the verification of the ISP usage certificate is successful, thus indicating that the ISP usage certificate is signed by the manufacturer does the NC then attempts to connect to the ISP. When an ISP and manufacturer terminate an agreement, the relationship server disables the ISP's managed access software; when the NC's attempt to connect to the ISP fails, the NC then dials the relationship server to receive a new ISP usage certificate.

30 Claims, 15 Drawing Sheets

SYSTEM BLOCK DIAGRAM 100

SYSTEM BLOCK DIAGRAM
100

NC CLIENT BLOCK DIAGRAM 101

| NVRAM | 1501 |
|---|---|
| RELATIONSHIP SERVER TELEPHONE NUMBER | M |
| MANUFACTURER SERIAL NUMBER | M |
| ENTERPRISE_ID | RS |
| ISP CERTIFICATE | RS |
| IAP MATRIX FOR ENTERPRISE_ID | RS |
|     IAP_ID | RS |
|     DNS1 | RS |
|     DNS2 | RS |
|     DIAL SCRIPT | RS |
|     IAP RULES | RS |
|     POP TELEPHONE NUMBER | RS |

| RAM | 1502 |
|---|---|
| ALL AVAILABLE ENTERPRISE_IDs | RS |
|     IAP MATRIX FOR EACH ENTERPRISE_ID | RS |

| ROM | 1503 |
|---|---|
| RELATIONSHIP SERVER PHONE NUMBER | * |
| ROOT AUTHORITY PUBLIC KEY | * |

| SMARTCARD ISP BLOCK | 1504 |
|---|---|
| ENTERPRISE_ID | RS, * |
| URL | RS, ISP |
| R/W MOUNT POINT | RS, ISP |
| NFS/CSFS FILE SERVER | RS, ISP |
| ISP SIGNATURE | RS, ISP |
| PROXY SERVER | RS, ISP |

*FIG. 15*

MECHANISM FOR DYNAMICALLY BINDING A NETWORK COMPUTER CLIENT DEVICE TO AN APPROVED INTERNET SERVICE PROVIDER

CROSS-REFERENCE TO RELATED APPLICATIONS

This Application is related to the following Applications:

(1) "Mechanism for Users with Internet Service Provider Smart Cards to Roam Among Geographically Disparate Authorized Network Computer Client Devices Without Mediation of a Central Authority," by Frank B. Dancs and James E. Zmuda.

(2) "Mechanism for Facilitating Secure Storage and Retrieval of Information on a Smart Card by an Internet Service Provider Using Various Network Computer Client Devices," by Frank B. Dancs and James E. Zmuda.

(3) "Internet Service Provider Preliminary User Registration Mechanism Provided by Centralized Authority," by Frank B. Dancs and James E. Zmuda.

Each of these related Applications is incorporated herein by reference.

BACKGROUND OF THE INVENTION

1. Field of the Invention

The present invention is in the field of network computer client devices (NCs) which rely upon a network connection to supply all necessary program files and data files. The present invention operates in an environment in which a relationship server is a central contact point for all NCs. Specifically, the present invention addresses the desire of NC manufacturers to authorize usage of their NCs only to connect to certain specific internet service providers (ISPs).

2. Discussion of the Related Art

In a network-centric computing environment, the three major computing components are a network computer client device (NC), a server device, and a smart card. The NC does not contain a hard disk, and therefore relies upon a network connection for virtually all program and data. Therefore, the NC needs the server device for booting security, file storage, and system management. The smart card is used to identify and authenticate a particular user and to carry individual information about the user. The user combines his smart card with an NC to access his logical workspace from the NC.

In the network-centric computing environment, there are several business entities. An internet service provider (ISP) is the entity with which the user has an agreement to provide basic server resources. An internet access provider (IAP) is an entity with which the ISP has a relationship for provision of its internet protocol (IP) address to enable users to connect to the internet. An ISP may function as its own IAP. An NC client device manufacturer builds NCs.

The various NC client device manufacturer desire the ability to control the ISPs to which their NCs can connect.

SUMMARY OF THE INVENTION

A network computer client device (NC) manufacturer desires the ability to authorize usage of its NCs only to access those specific internet service providers (ISPs) with which it has established business relationships. These authorizations may change over time and the NC manufacturer desires the ability to change the ISP connection capabilities of its NCs so as to facilitate connection only to those currently authorized ISPs.

According to an aspect of the present invention, all manufacturers' authorizations to connect to specific ISPs are maintained in a central database associated with a relationship server. The manufacturers may change these authorizations over time. The relationship server issues digital certificates, such as X.509 certificates in the preferred embodiment, which associate various ISPs to their respective public keys. Each ISP is assigned a unique number by the relationship server. In the preferred embodiment, the serial number associated with each certificate becomes an enterprise identification number which uniquely identifies the ISP designated in the certificate. To authorize a specific ISP, the manufacturer begins with the relationship server's ISP certificate. Using its own private key, the manufacturer computes its own digital signature for the relationship server's ISP certificate and appends this digital signature to the relationship server's ISP certificate, thereby creating an ISP usage certificate valid for its NCs. After digitally signing all the relationship server's ISP certificates for which the manufacturer desires to authorize connection to its NCs, the manufacturer delivers all its ISP usage certificates back to the relationship server. The manufacturer may send additional ISP usage certificates to the relationship server at any time, and may revoke existing ISP usage certificates.

According to another aspect of the present invention, upon first powering on, each NC dials the relationship server and transmits its manufacturer identification number. The relationship server uses the manufacturer identification number to find the ISP usage certificates corresponding to the NC manufacturer. In the preferred embodiment, the NC also sends the relationship server an enterprise identification number from the user's smart card. The relationship server then sends to the NC the ISP usage certificate corresponding to the enterprise identification number, or corresponding to the user's selection if no enterprise identification number on the smart card is established.

According to another aspect of the present invention, the NC performs a cryptographic verification of the ISP usage certificate using the manufacturer's public key which is permanently stored in the NC in read only memory, for example. Only if the verification of the ISP usage certificate is successful, thus indicating that the ISP usage certificate is signed by the manufacturer does the NC then attempts to connect to the ISP.

According to yet another aspect of the present invention, ISP managed access software controlled by the relationship server is required to interface an NC to an ISP. When an ISP and manufacturer terminate an agreement, the relationship server disables the ISP's managed access software. A stale ISP usage certificate may exist on an NC if an ISP authorization has been revoked by the manufacturer since the NC's last connection to the relationship server. In this event according to the present invention, when the NC's attempt to connect to the ISP fails because of the disabled ISP managed access software, the NC then dials the relationship server to receive a new ISP usage certificate corresponding to a different, and perhaps newly authorized ISP.

In the preferred embodiment of the present invention, the ISP usage certificates, the relationship server telephone number, and the manufacturer serial number are stored in a non-volatile memory within the NC, and the manufacturer's public key is stored in a read only memory.

These and other features and advantages of the present invention will be apparent from the Detailed Description of the Invention in conjunction with the Figures

BRIEF DESCRIPTION OF THE DRAWINGS

FIG. 15 illustrates the various fields of the non-volatile memory (NVRAM), random access memory (RAM), and read only memory (ROM) within the NC and the contents of the smart card, as well as indicating who has permission to write the various fields, in accordance with the present invention.

In the FIGS. 1 through 15, like parts are referred to with like reference numerals. The Figures. are more thoroughly explained in the Detailed Description of the Invention.

DETAILED DESCRIPTION OF THE INVENTION

The present invention operates in the environment of a system for providing managed access to network computer devices (NCs). NC manufacturers and distributers may utilize the methods of the present invention to ensure that the NCs they manufacturer or distribute are able to connect only to internet service providers (ISPs) that they authorize. Some manufacturers and distributors may provide their own internet service; other manufacturers or distributors will contract with ISP partners to provide internet service for the NCs they manufacture or distribute. NCs accept and require smart cards to be inserted before becoming operational to connect to an ISP. Each smart card is typically associated with an individual user. A smart card ultimately will contain information pertinent to a specific user's relationship with one or more specific ISPs.

According to the managed access environment, a specific NC will only provide internet service connectivity when a smart card is inserted that has been at least preliminarily registered with a partner ISP of the NCs manufacturer or distributor.

Figure 1:
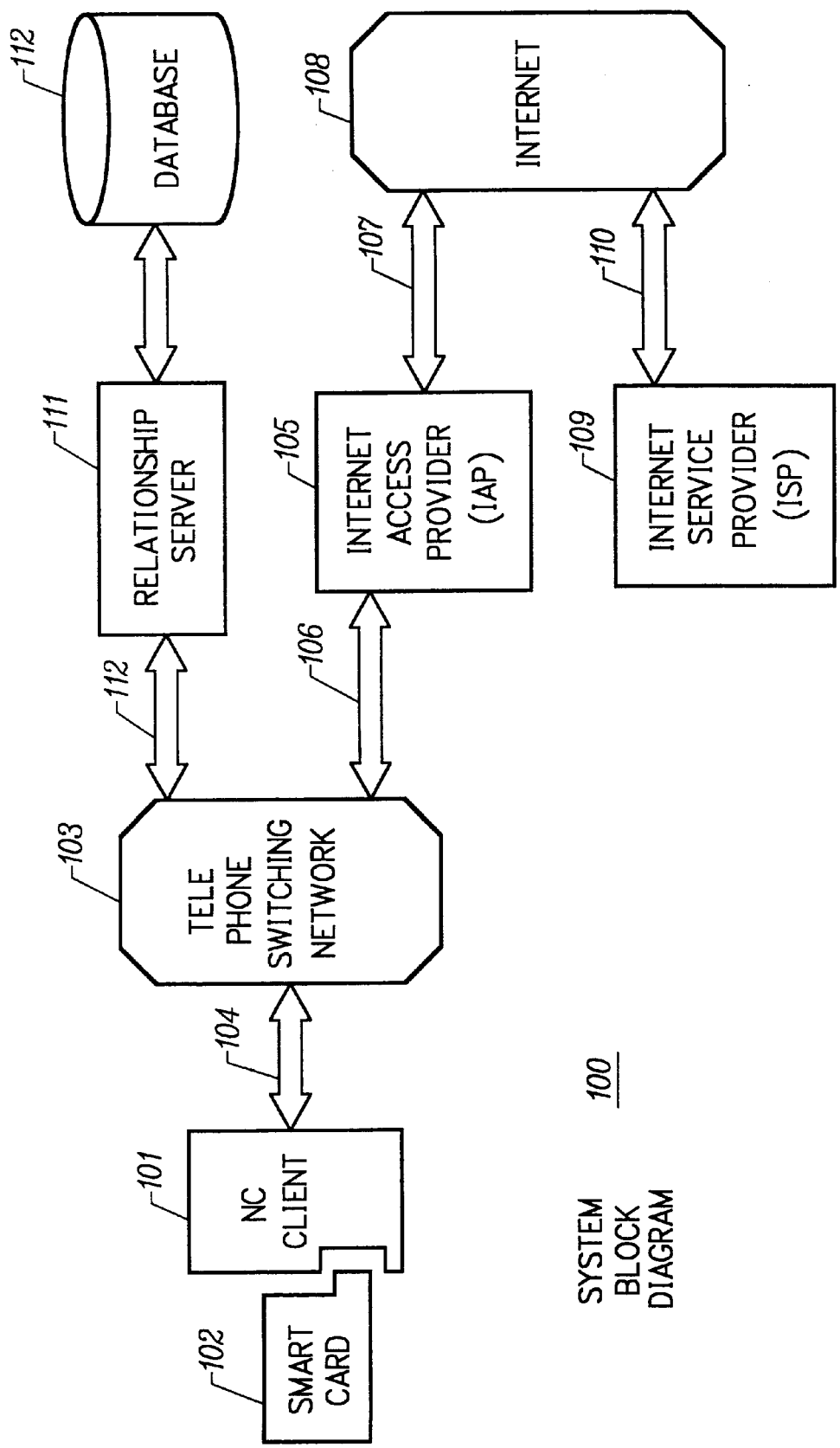
FIG. 1 illustrates the distributed computing system architecture in accordance with the present invention.

FIG. 1 illustrates the key components of the managed access environment 100 according to the present invention. An NC client 101 accepts a smart card 102. The NC client 101 communicates through the telephone system 103 using a standard telephone line 104, such as POTS (plain old telephone service) or ISDN (integrated services digital network). An internet access provider (IAP) 105 is also connected to the telephone system 103, and can be reached by dialing its telephone number. The IAP 105 contains a modem bank (not shown) which receives data from its telephone line 106 and transmits the data in the appropriate internet format on its internet connection 107 onto the internet 108.

An ISP 109 also has a digital link 110 to the internet 108 which allows it to receive data sent from the NC client 101 through the IAP 105. The ISP 109 also sends data to the NC client 101 through the IAP 105 modem bank (not shown). A relationship server 111 is also connected to the telephone switching network 103 through a standard telephone line and can be reached by dialing a specific toll free number such as 1-800-735-2846, which corresponds to 1-800-RELATIONSHIP. The relationship server 111 is connected to a database 112 which maintains information regarding manufacturer or distributer relationships with ISPs.

According to present invention, the smart card 102 may be written with an alternative relationship server telephone number to be used in the event that relationship server 111 hard coded into the ROM 202 is stopped or a relationship between the manufacturer and the relationship server 111 is terminated. The alternative relationship server telephone number is signed by the entity owning the root public key found in the ROM 202.

An IAP 105 (Internet Access Provider) is the corporate entity providing Internet Protocol (IP) Addresses and other boot services; perhaps distinct from the Telecommunications company providing communication hardware. An ISP (Internet Service Provider) is the corporate entity the NC User has an agreement with to provide content (e.g. NetChannel, AOL, CompuServe). An NC User is an individual in possession of an NC smart card 102. An ENTERPRISE_ID is a unique identifier for either an ISP 109 or corporate client.

Figure 2:
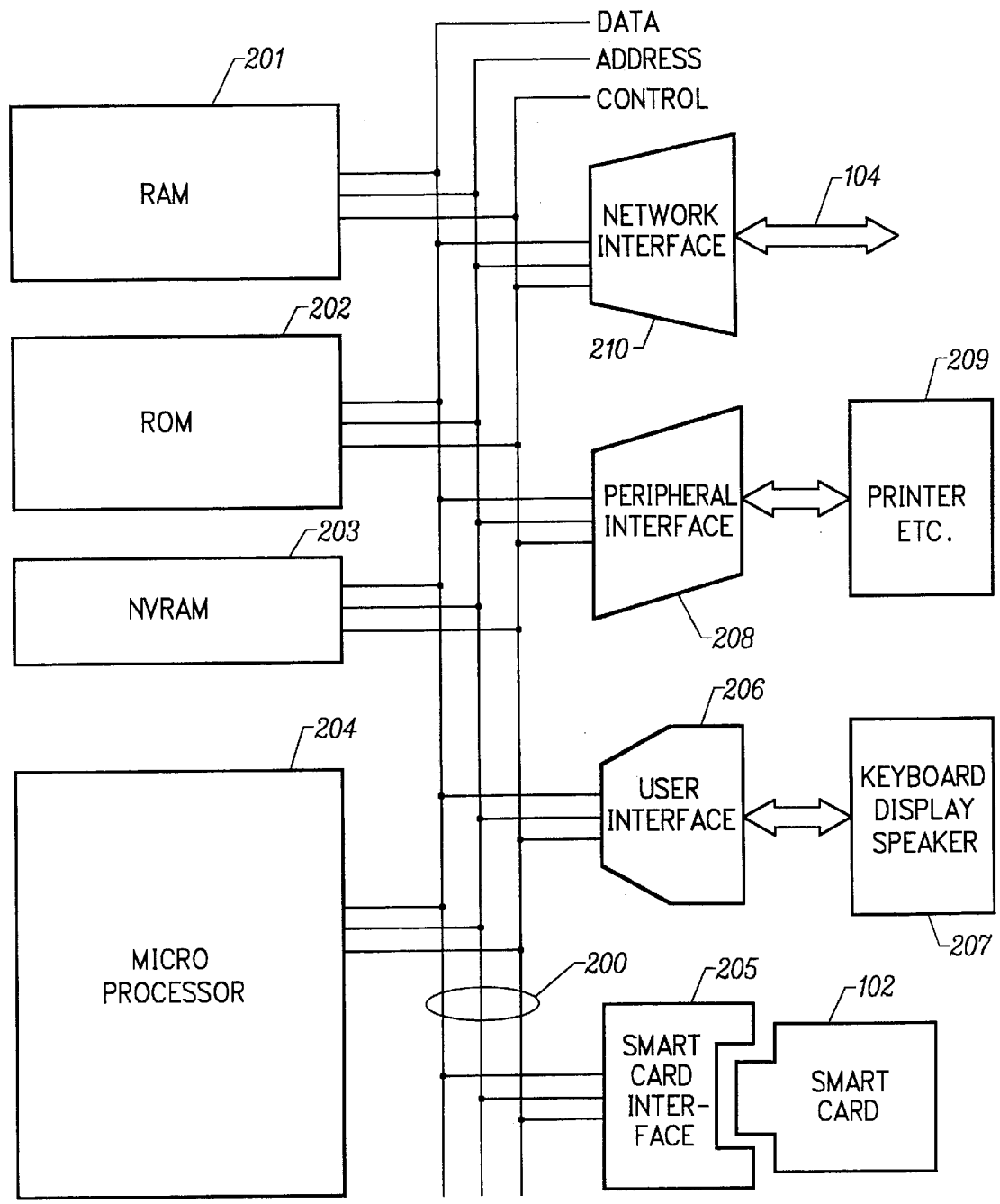
FIG. 2 is a block diagram illustrating the logical architecture of a network computer client device (NC) in accordance with the present invention.
Figure 3:
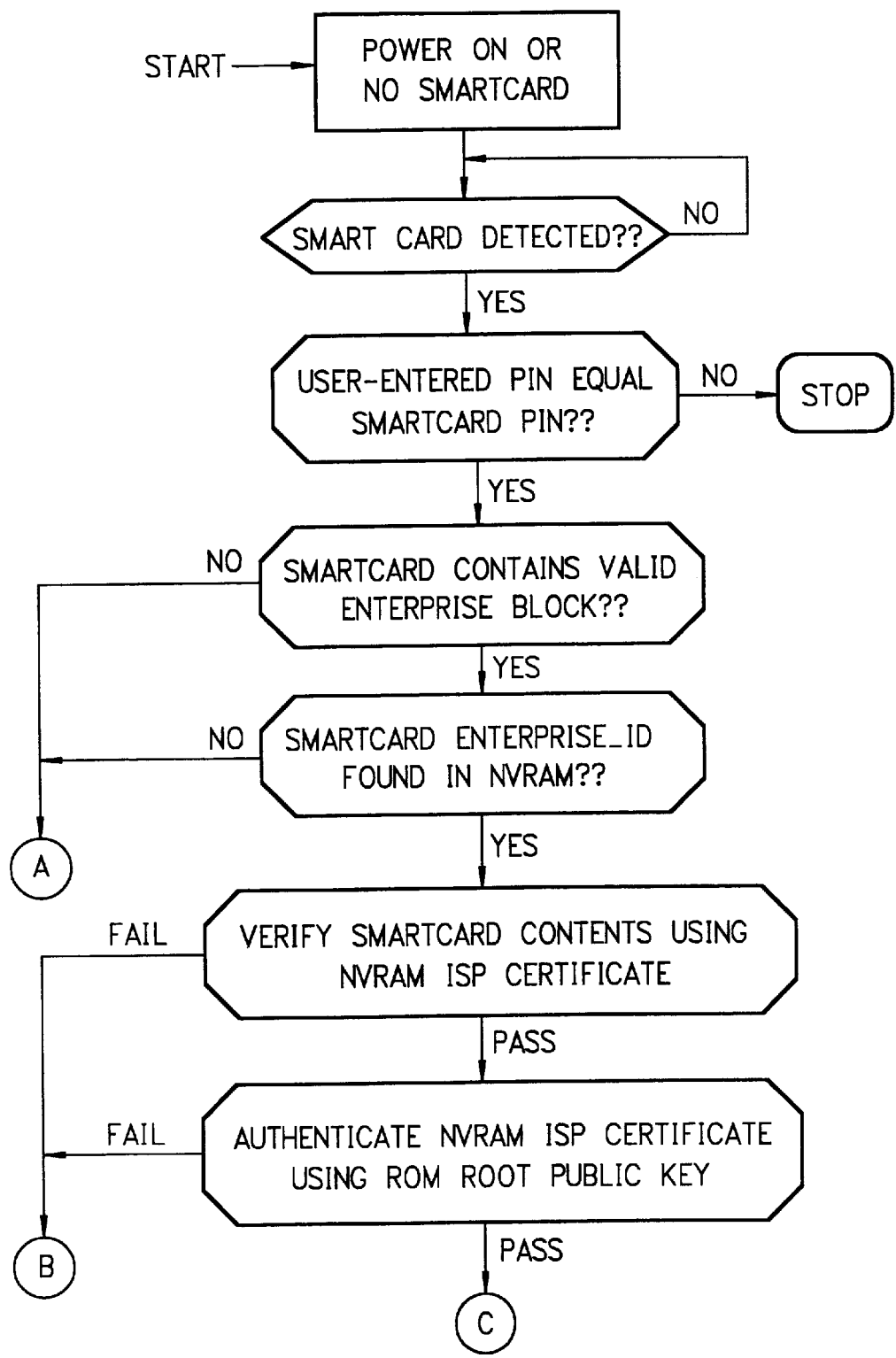
FIG. 3 is the first flow chart illustrating the method of operation of the NC in accordance with the present invention.
Figure 4:
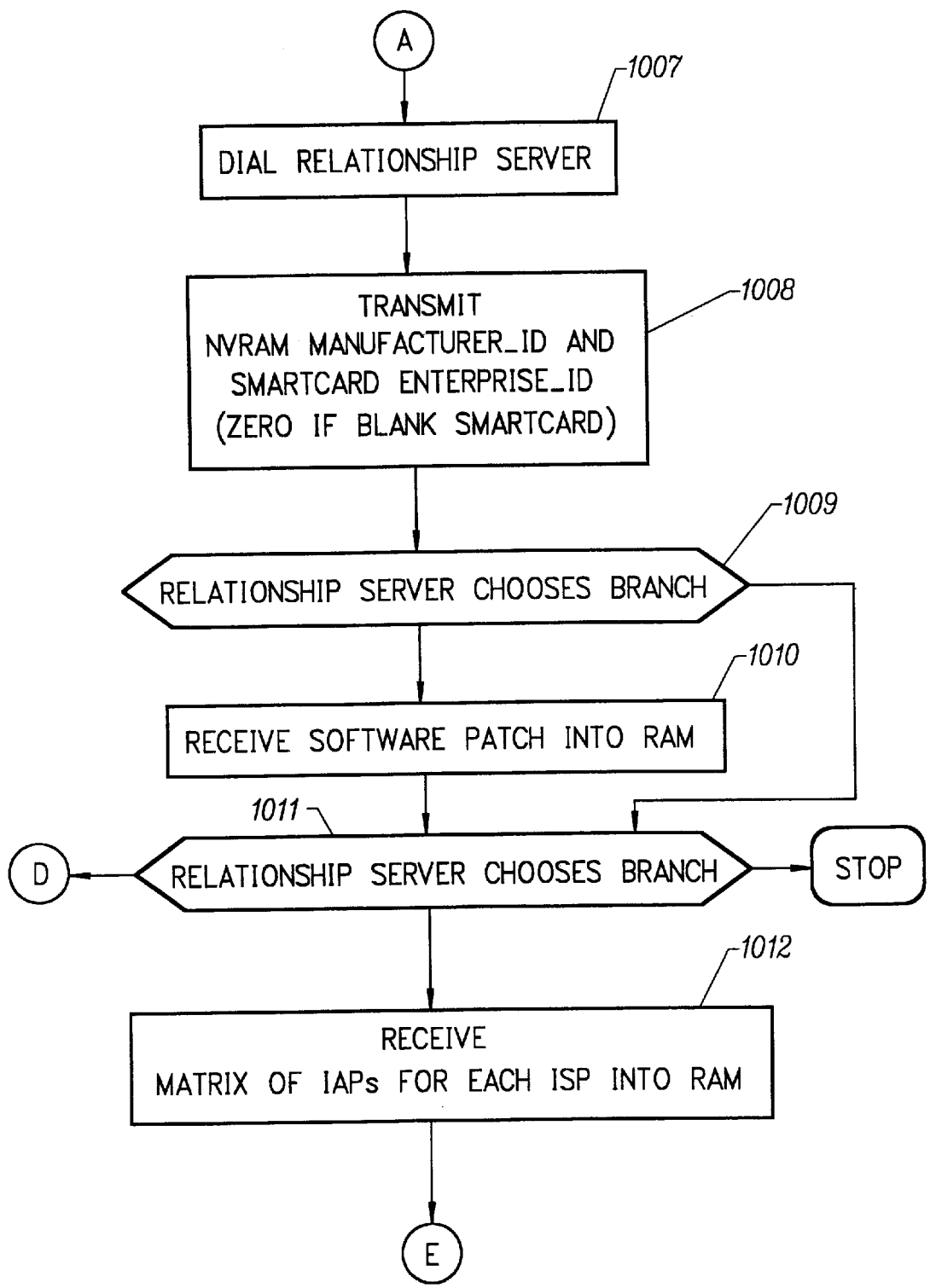
FIG. 4 is the second first flow chart illustrating the method of operation of the NC in accordance with the present invention.
Figure 5:
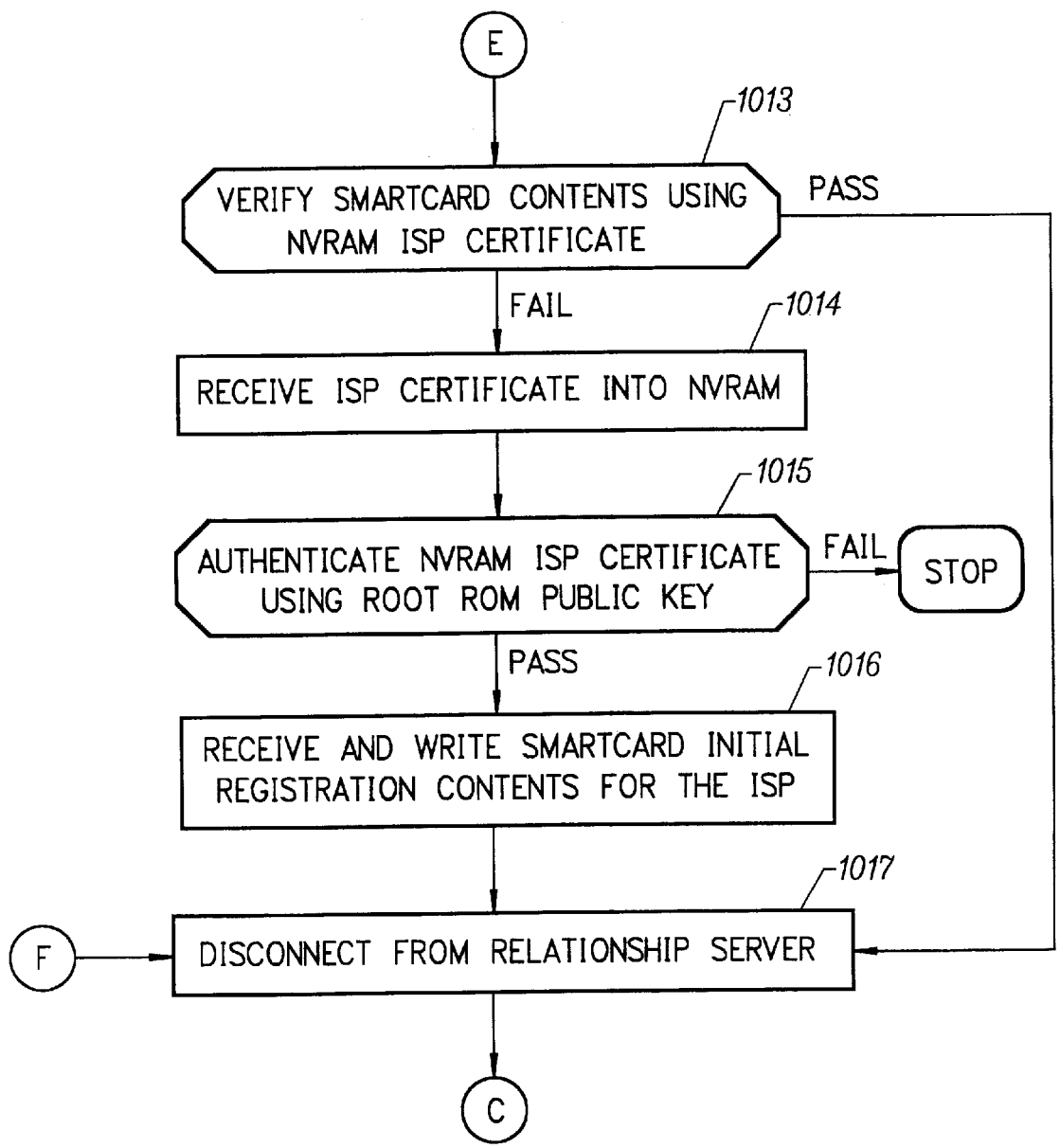
FIG. 5 is the third flow chart illustrating the method of operation of the NC in accordance with the present invention.
Figure 6:
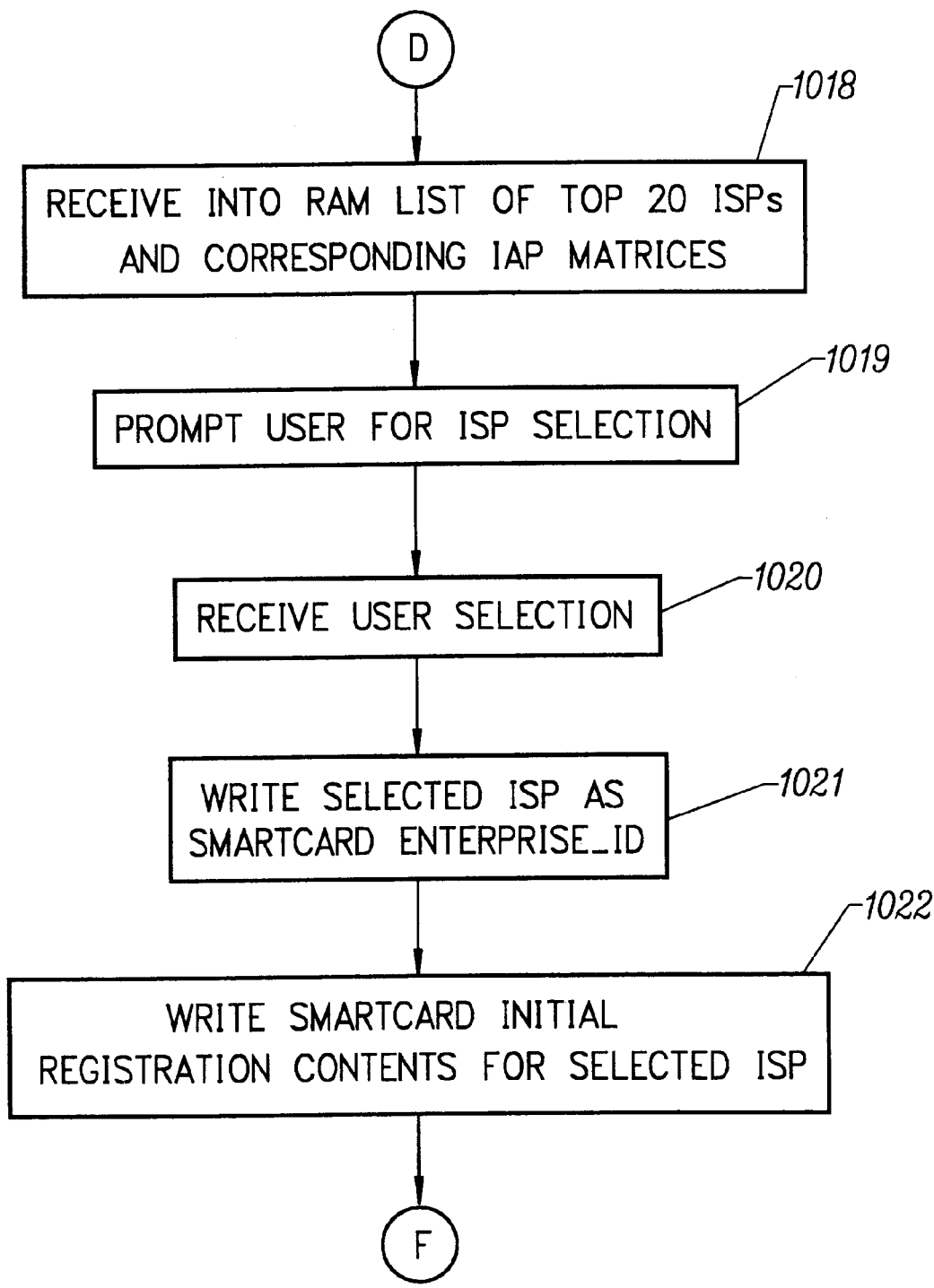
FIG. 6 is the fourth flow chart illustrating the method of operation of the NC in accordance with the present invention.
Figure 7:
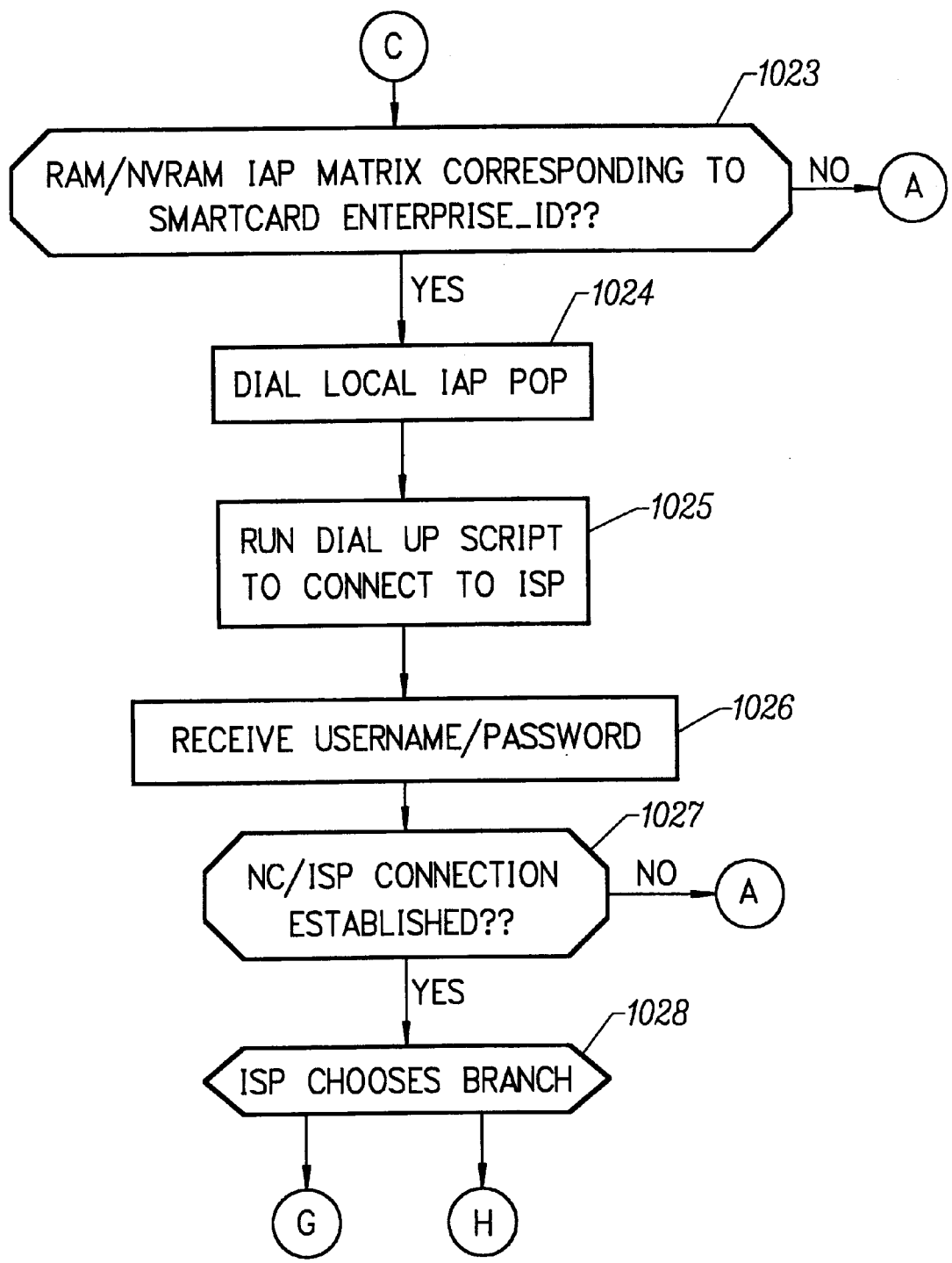
FIG. 7 is the fifth flow chart illustrating the method of operation of the NC in accordance with the present invention.
Figure 8:
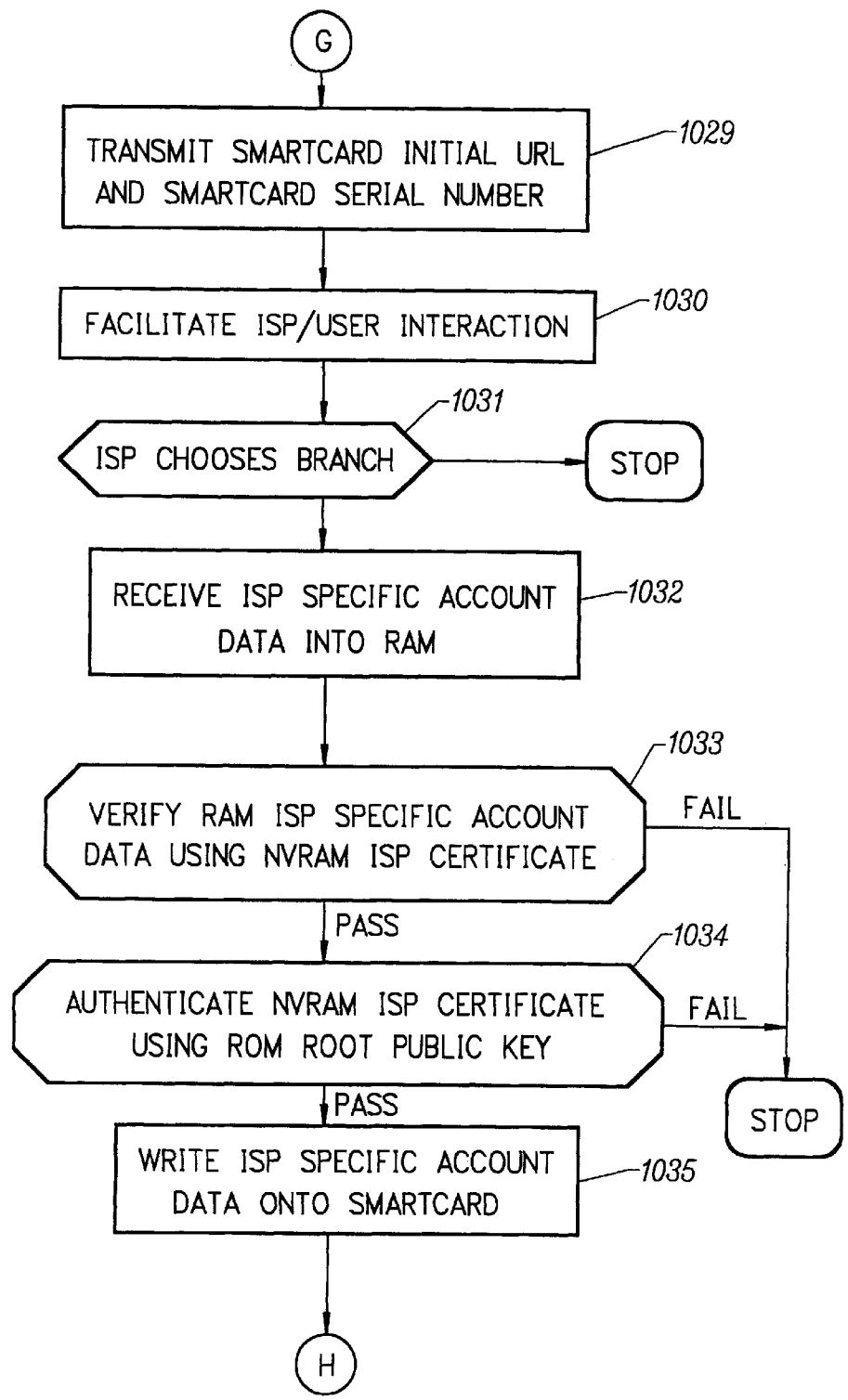
FIG. 8 is the sixth flow chart illustrating the method of operation of the NC in accordance with the present invention.
Figure 9:
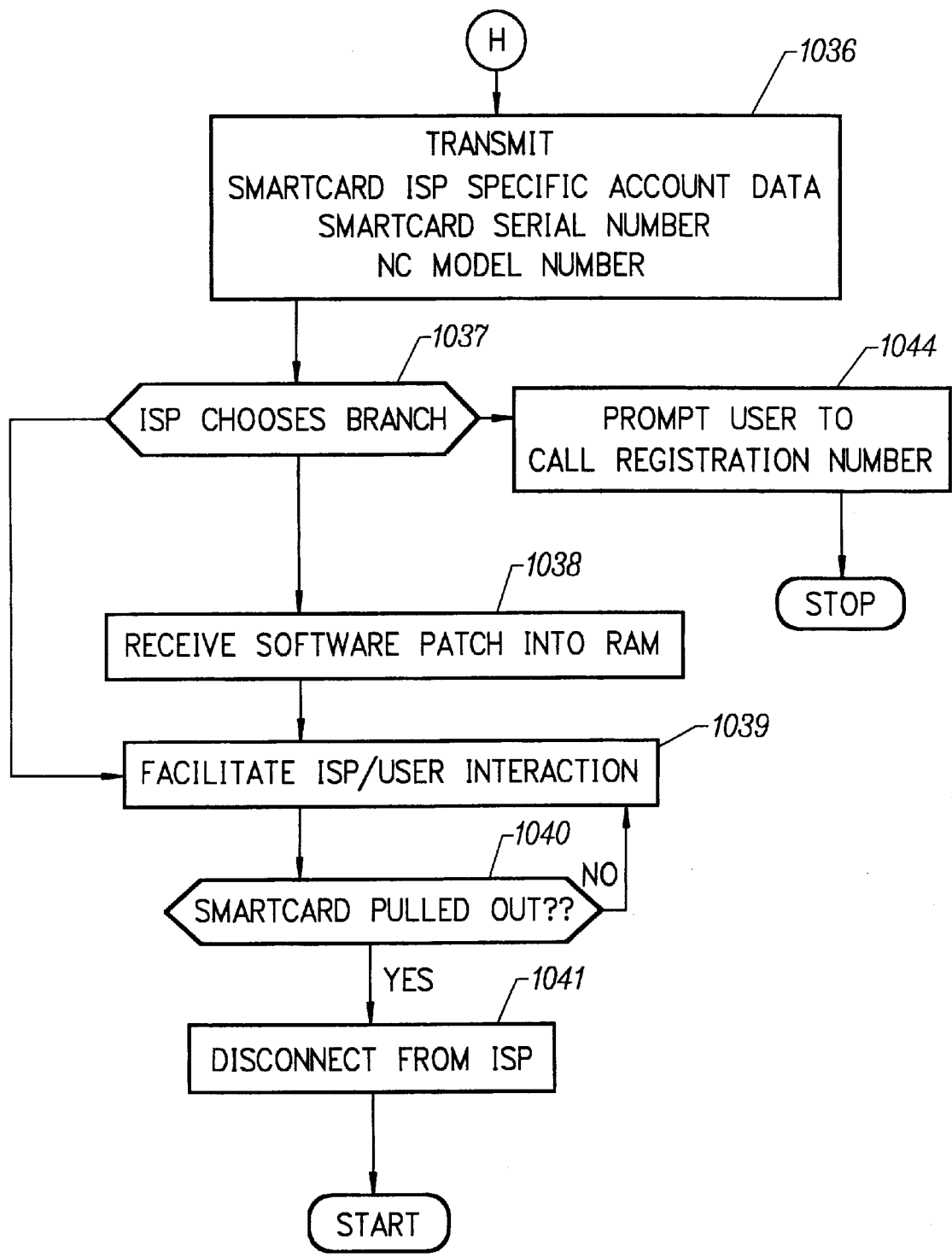
FIG. 9 is the seventh flow chart illustrating the method of operation of the NC in accordance with the present invention.
Figure 10:
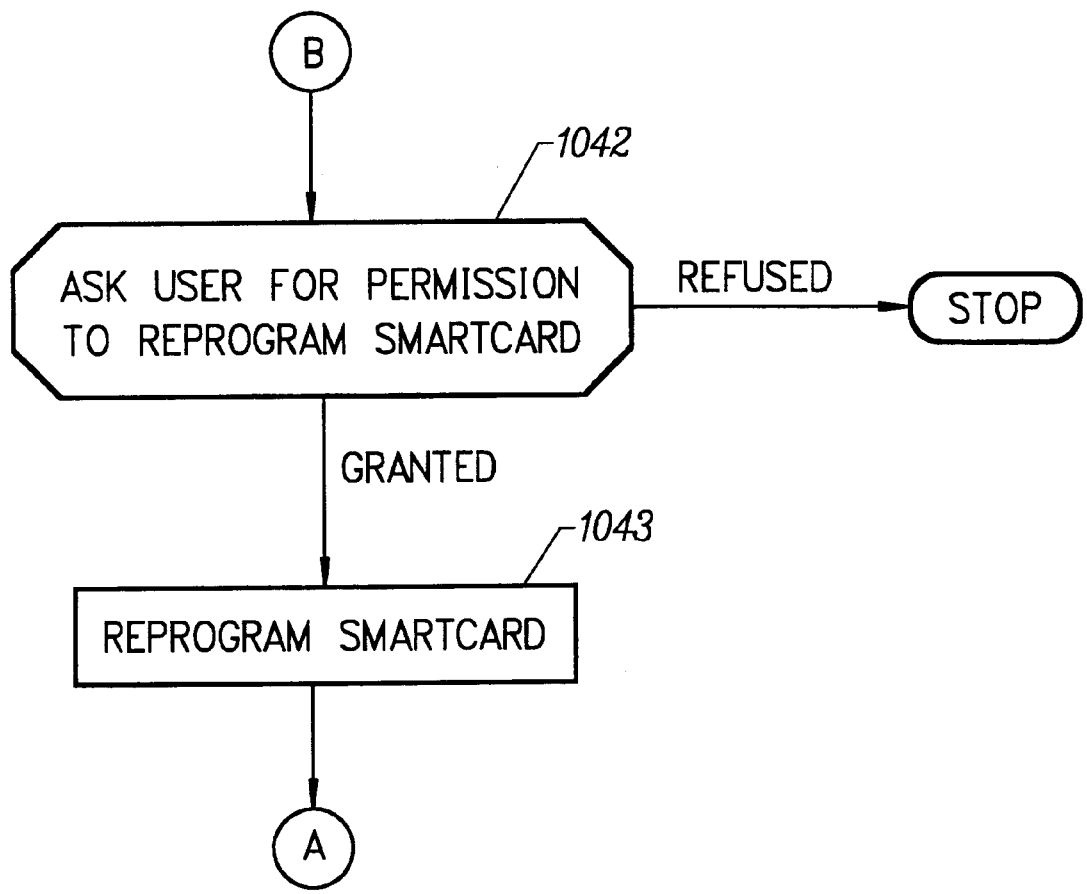
FIG. 10 is the eighth flow chart illustrating the method of operation of the NC in accordance with the present invention.
Figure 11:
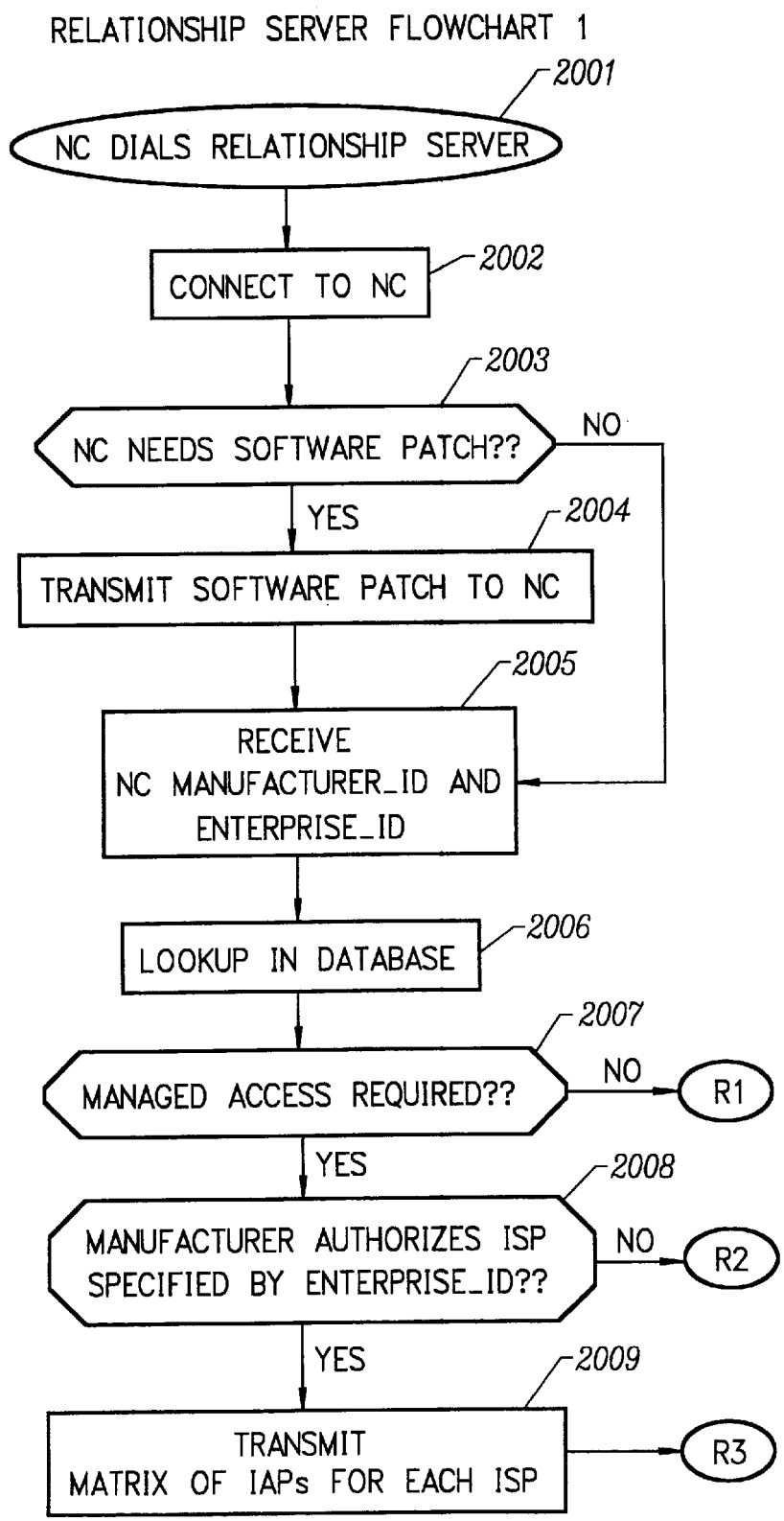
FIG. 11 is the first flow chart illustrating the method of operation of the relationship server in accordance with the present invention.
Figure 12:
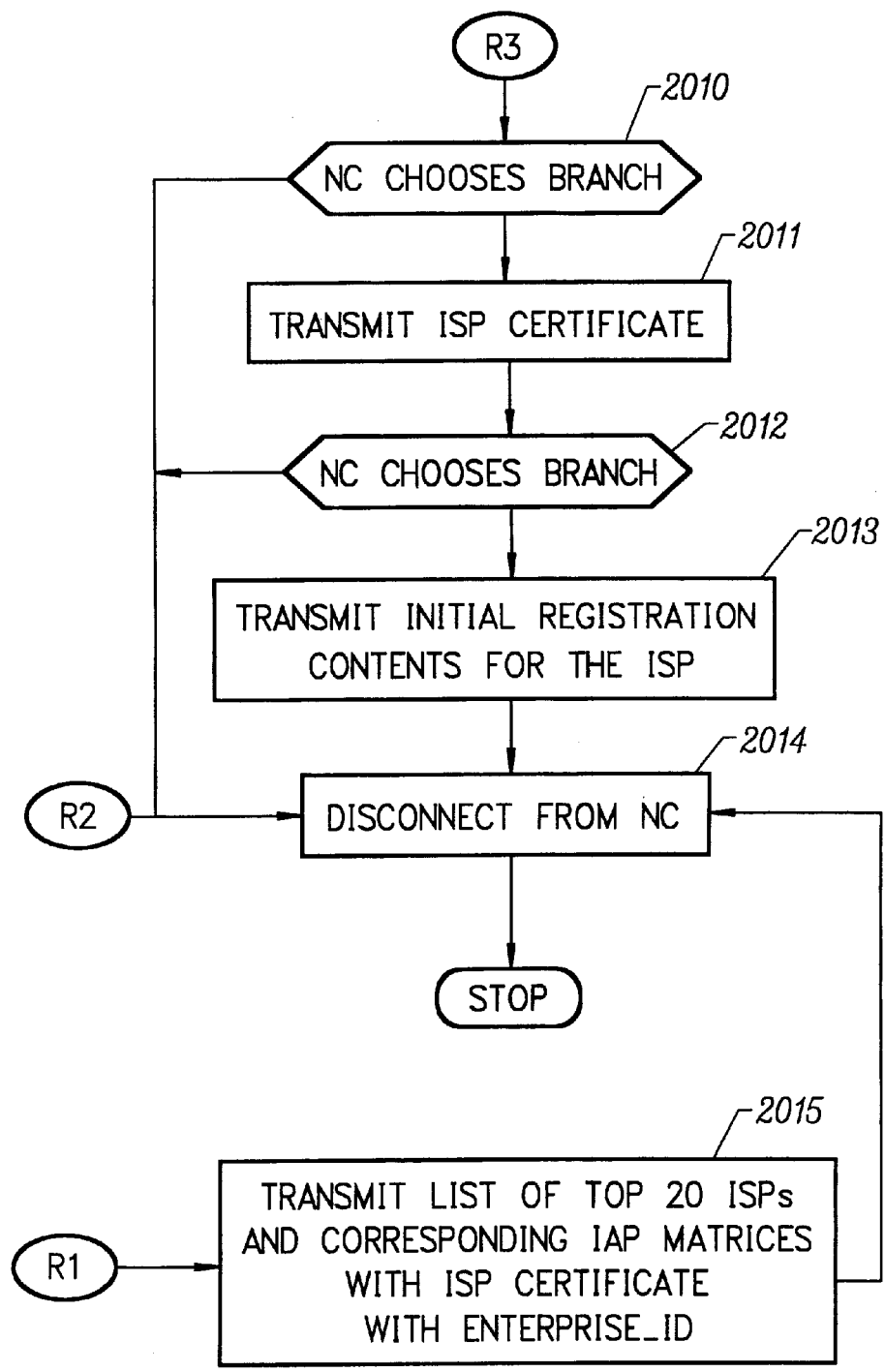
FIG. 12 is the second flow chart illustrating the method of operation of the relationship server in accordance with the present invention.
Figure 13:
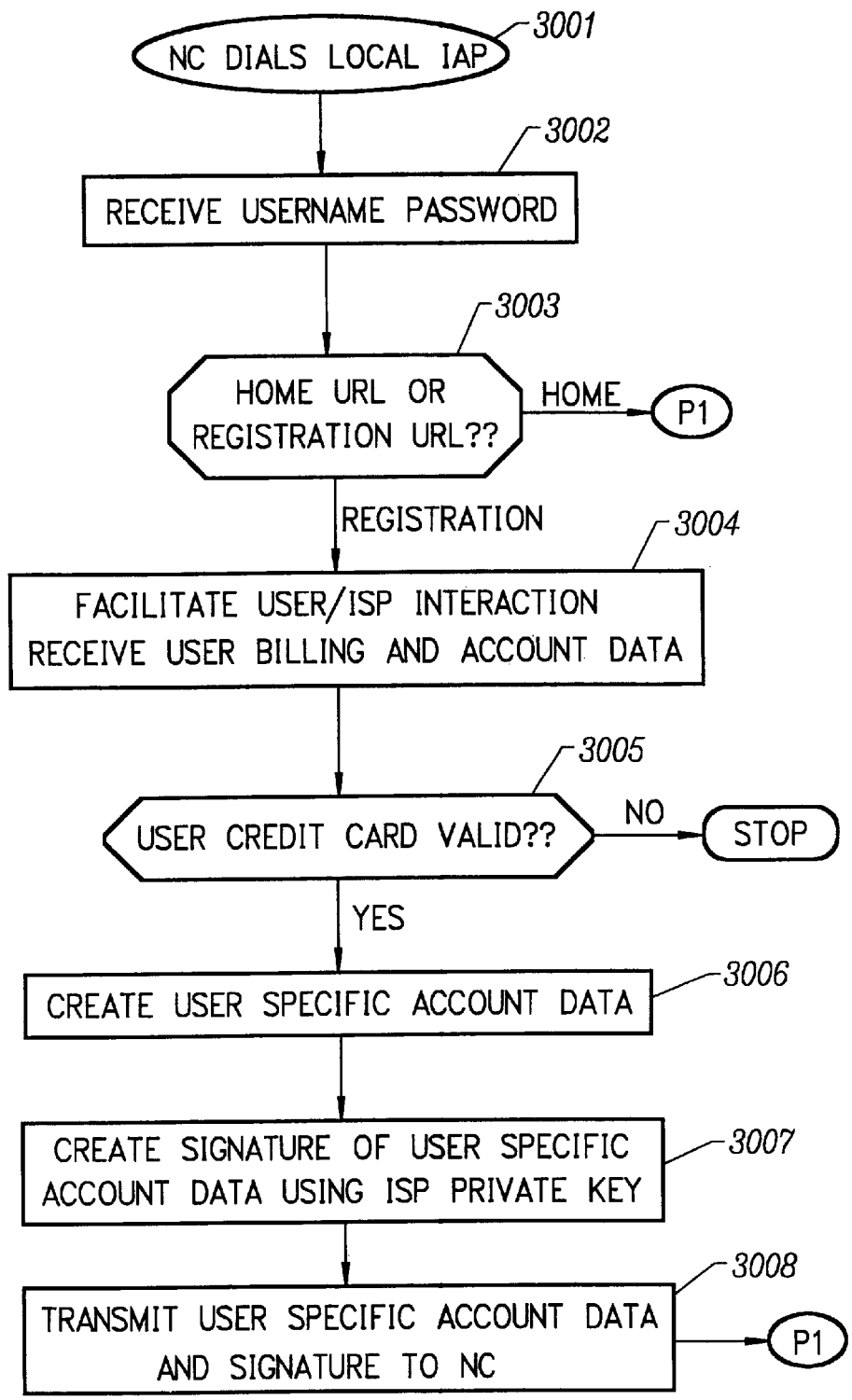
FIG. 13 is the first flow chart illustrating the method of operation of the internet access provider (IAP) and internet service provider (ISP) in accordance with the present invention.
Figure 14:
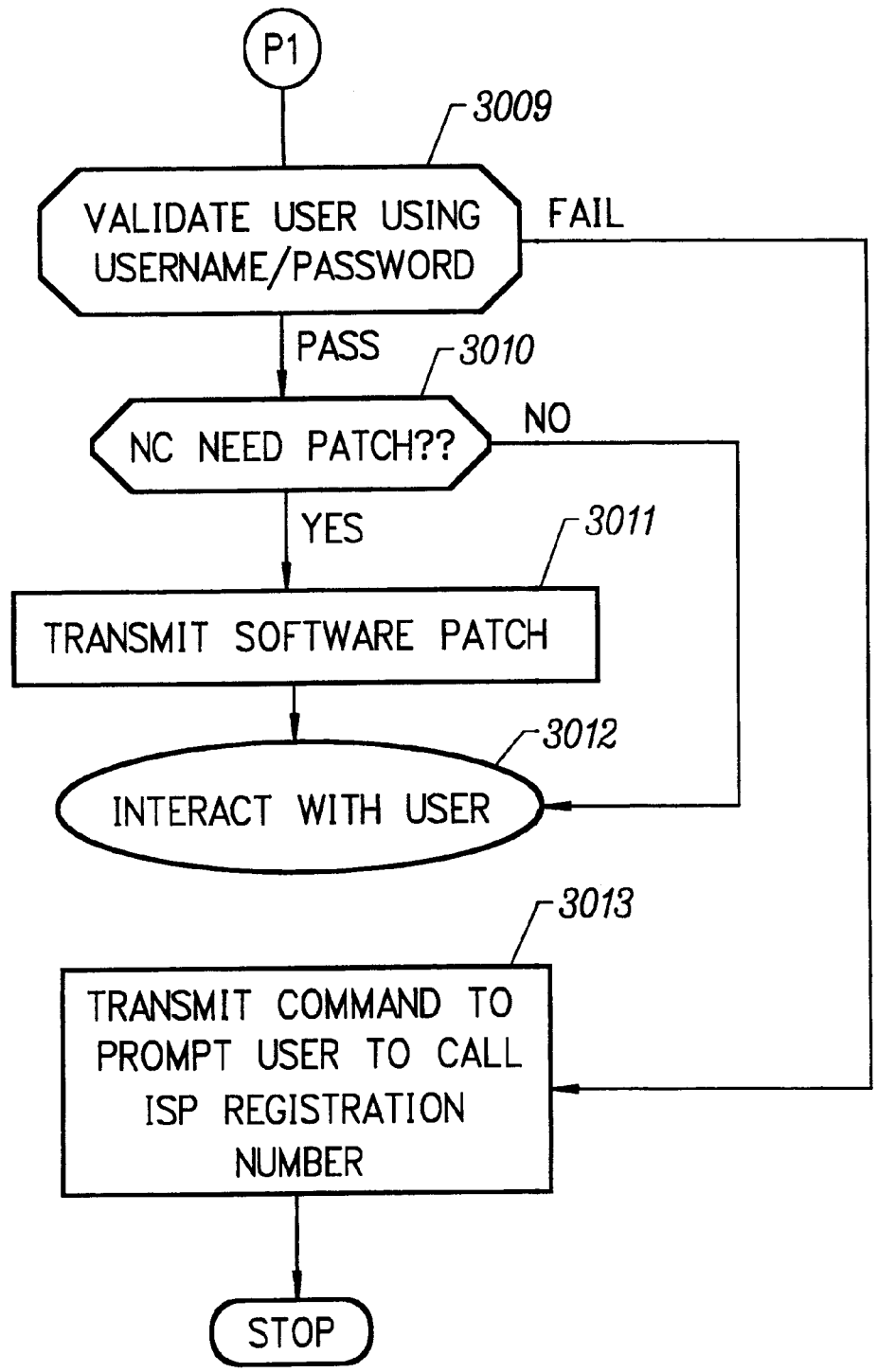
FIG. 14 is the second flow chart illustrating the method of operation of the IAP and ISP in accordance with the present invention.

FIG. 2 is a block diagram showing a possible configuration of an NC client 101 suitable for use in the managed access system according to the present invention. The NC 101 includes a random access memory (RAM) 201, a read only memory (ROM) 202, and non-volatile random access memory (NVRAM) 203 which are all tied to a microprocessor 204 via an internal bus 200. The smart card 102 connects to a smart card interface unit 205 which also connects to the internal bus 200. A user interface 206 provides interfaces the internal bus 200 to all the user interface apparatus 207. Thus, the user interface 206 accepts inputs from a keyboard and drives a display and speaker. A peripheral interface 208 connects the internal bus 200 to any possible peripherals 209, such as a printer or facsimile machine. A network interface 210 connects the internal bus 200 to the telephone network 103 through the telephone line 104. The block diagram illustrated in FIG. 2 for the NC client 101 is shown by way of example, not by way of limitation. For example, the NVRAM 203 is entirely optional, RAM 201 can alternatively be used to provide the functions as described herein in the context of the preferred embodiment as being provided by the NVRAM 203. A wide variety of general purpose computing devices can be constructed to operated as NCs so long as they include sufficient RAM 201, ROM 202, and NVRAM 203 and can accommodate a smart card 102 and network connection 104. Furthermore, the internal organization of the NC client 101 is not limited to the single bus 200 architecture shown in FIG. 2. For example, the RAM 201, ROM 202, and NVRAM 203 might be tied to the microprocessor 204 using a memory bus 200, while the smart card interface 205, user interface 206, peripheral interface 208 (if present), and network interface 210 are tied to the microprocessor using one or more separate internal busses (not shown). NVRAM 203 is optional; the RAM 201 can be used in the alternative to NVRAM 203 to provide the same functions. In addition, other elements can be added to the NC client 101. For example, a separate system controller chip (not shown) or graphics or cryptographic accelerator (not shown) may also be included in the NC client 101.

The NC client 101 typically does not include a hard disk drive. Therefore, aside from the small amount of boot code and other data stored in the ROM 202, all code and data which the NC client 101 uses is provided to it through its network connection 104. According to the present invention, managed access requires that a manufacturer's NCs are tied to the manufacturer's partner ISP 109. Because the NC client 101 does not have a hard disk drive, the NC client 101 is essentially useless without the manufacturer's partner ISP 109.

According to the managed access system of the present invention, a specific manufacturer's NC client 101 can only be used with authorized services; conversely, the NC client 101 is prevented from accessing unauthorized services according to the present invention. The NC client 101 is required to connect to the relationship server 111 upon its first use when its NVRAM 203 is empty. The relationship server 111 maintains a database 112 including all manufacturers' unique identification numbers and the relationships those manufacturers have with various ISPs. When the NC client 101 is first switched on it calls the relationship server 111 and transmits its unique device identification number. Its device identification number is a composite which includes the manufacturer identification number, the model number, and the device serial number. The relationship server 111 looks up the manufacturer identification number in the database 112, finds the manufacturer, and then scans the list of partner ISPs. If the relationship server 111 finds a suitable ISP partner in the database 112, the relationship server 111 sends back to the NC client 101 connect information for the partner ISP services, and for the various IAPs which correspond to the partner ISP services. In the event that the relationship server 111 is run by an ISP 109, then the database 112 contains information regarding which manufacturers have a relationship with the ISP 109.

According to the managed access system of the present invention, users of authorized services may roam to various NC clients which are made by the same manufacturer. Additionally, users may roam to various NC clients manufactured by different manufacturers so long as the different NC manufacturers each authorize connection to the roaming user's ISP service.

User roaming to various NC client devices made by the same manufacturer occurs when a user of NC client A made by manufacturer A to connect to an ISP moves to NC client B made by manufacturer A and inserts his personal smart card 102 to connect to the ISP. In this event, the NC client B reads the ENTERPRISE_ID on the smart card 102 to determine if the ENTERPRISE_ID matches anything the NC client B has in its RAM 201. If a match exists, then a check of NVRAM 203 is performed for a valid account with a valid IAP 105 to get to the ISP. If the NC client B locates a match in NVRAM 203, then the NC client B will dial the local IAP 105 and will allow the user to login into the ISP 109. The ISP 109 holds 'home' server information for the user and is therefore able to grant access to the user's files from wherever the user is. If the NC client B does not contain the ENTERPRISE_ID found on the user's smart card 102, then the NC client B will call the relationship server 111 to find out if there has been a new agreement established by the NC client manufacturer since its last call to the relationship server 111. If the manufacturer has indeed established a new partner identified by the user's ENTERPRISE_ID, the NC client 101 downloads the new ISP and corresponding IAP information and connects to the new ISP identified by the user's ENTERPRISE_ID.

User roaming to NC client devices made by different manufactures occurs when a user of NC client A made by manufacturer A to connect to an ISP moves to NC client B made by manufacturer B and inserts his personal smart card 102 to connect to the same ISP. If both manufacturers A and B have agreements with the desired ISP, then the process described above is carried out. The NC client device 101 is linked to the ISP through the relationship server database 112 as long as the NC client manufacturer has an agreement in place that matches the ENTERPRISE_ID coming from the smart card 102. If manufacturer B does not have an agreement with the desired ISP, then the NC client B is unable to connect to the ISP.

According to the present invention, a single NC client 101 may include authorization for several ISPs. According to an embodiment, the smart card 102 supports multiple ENTERPRISE_ID entries so that the user can purchase a combination smart card 102 with multiple ISPs accounts on it, in which case the NC client 101 prompts the user to choose to which ISP to attempt connection. According to another embodiment, when the NC client 101 dials the relationship server 111, all POP (Point of Presence) information for all the ISP partners that NC client manufacturer has is loaded into RAM 201. Therefore, one user with an ISP A smart card can use the NC client 101 having the correct contact information for ISP A. Another user with an ISP B smart card can subsequently use the NC client 101 having the correct contact information for ISP B.

Managed access requires the NC 101 to call a relationship server 111 when a blank card is inserted or the NVRAM/RAM contents are null and download appropriate initialization values based on the ENTERPRISE_ID. These contents are certified with a private key that only the manufacturer or trusted root authority holds. Furthermore, the relationship server 111 downloads a certified ISP public key.

Next, the NC device 101 calls the ISP and completes the registration process. The ISP's registration procedure writes home URL, DNS IP addresses, mount point and other appropriate information to the smart card 102 certified by the ISP. In other words, the ISP completes this process by placing a certificate on the smart card 102 that can be used to certify the contents and that only the ISP could have written the contents. The next time the NC 101 is turned on and the smart card 102 inserted, the NC 101 validates the contents of the smart card 102 by using the public key found in the ISP certificate, validates the ISP public key by using the public found in the ROM. Thus, the manufacturer is the root of the entire certification hierarchy. When the NC client 101 boots, it reads the contents of the smart card 102, uses the certificate to verify the contents and uses the public key stored in ROM 202 to verify the certificate.

The method carried out by the NC client device 101 using the managed access software according to the present invention is illustrated in FIGS. 3 through 10 (NC flow charts 1 through 8). The method starts at step 1001 when the NC client device power switch is turned on. If at any time during the method illustrated in NC flow charts 1 through 8 the user's smart card 102 is pulled out of the NC client device 101, then the method for managed access returns immediately to step 1001.

At step 1002, the NC client device 101 checks to see if a smart card 102 is inserted into the NC's smart card slot. If no smart card 102 is inserted, then the managed access software continues to look for the smart card 102 at step 1002 until it is inserted. At optional step 1003, if there is a Personal Identification Number (PIN) associated with the smart card 102, the NC client device 101 asks for the user's personal identification number and compares it with the PIN on the smart card 102. If the PINs do not match, then the process stops. However, if the PINs do in fact match, then the method proceeds to step 1004, if the smart card ENTERPRISE_ID matches an ENTERPRISE_ID found in the nonvolatile memory 203 of the NC client device 101, then the method proceeds to step 1005. If there is no match between the ENTERPRISE_ID on the smart card 102 and that found in NVRAM, then the method according to the present invention dials a relationship server 111 at step 1007 in NC flow chart 2.

When delivered to the NC client 101 by the relationship server 111, the root ISP certificate is written to NVRAM 203 or RAM 201 so as to enable user roaming to different NC client devices 101 authorized to connect to the same ISP 109 without depending on the same root public key being stored in all ROMs as the root authority. The certificate controlling usage of any given NC client 101 is created by the root authority whose public key is stored in the NC clients' ROM 202. All root ISP certificates are created by the root authority and are delivered to the relationship server's database 112. The smart card 102 contains information that is associated permanently with a particular user, and is not subject to the user's location. This includes, for example, the user's current home URL (universal resource locator), and the NFS/CSFS mount point. Information that is associated with the location of the client is stored in the NC client's RAM 201 and/or NVRAM 203. This includes, for example, the ISP's IAP connect matrix and the DNS (domain name server).

The NC client 101 will store the connection details regarding the last successful ISP connection in NVRAM 203 because the NC client 101 must be able to cope with a power cycle without calling the relationship server 111. Upon restarting, if the NC client 101 has valid connection information already stored in NVRAM 203, the user will be prompted to specify whether or not the NC client 101 may use the connection information already stored in NVRAM 203 to connect to the IAP 105. In general, if the NC client 101 has moved to a different telephone number, the user will answer "no" and will force the NC client 101 to call the relationship server 111 and to download local telephone and IAP connection information. This allows the user to prevent an NC client 101 which was previously used to connect to a distant IAP from dialing a non-local telephone number in order to connect to the same distant IAP 105.

The test performed in step 1004 will be false if the smart card 102 does not contain an ENTERPRISE_ID (therefore has an ENTERPRISE_4ID of zero), if there is no ENTERPRISE_ID found in non-volatile memory 203, or if the smart card 102 and the nonvolatile memory of the NC client device 101 store different ENTERPRISE_IDs. However, in the case of a match, the method proceeds to step 1005 at which a cryptographic verification of the smart card contents is performed using an Internet Service Provider (ISP) usage certificate found in nonvolatile memory 203.

Every NC client 101 has either the manufacturer's or distributor's public key or the public key of trusted authority written into the ROM 202. One example of such a trusted authority is the author of the managed access software according to the present invention which is provided to the relationship server 111, the ISP 109, and the NC client 101. The public key which is written in ROM 202 serves as the root authority for verification of the certificates, and is therefore referred to as the root public key. The root public key must be stored in ROM 202 in order to guarantee its integrity; because the ROM 202 cannot be overwritten or altered, its contents are deemed safe. The public key stored in ROM 202 is the root public key responsible for verifying the signatures on all issued information or certificates from the root authority, such as the NC client manufacturer, the NC client distributor, or the managed access software author or distributor.

Before using information on the smart card 102, the NC device 101 will verify the contents of the smart card 102 using the cryptographic signatures appended to the contents. Although any information to be stored in the RAM 201 or NVRAM 203 includes a digital signature portion, this digital signature is used only once for verification at the time of writing. Assuming that the digital signature checks at the time of writing to RAM 201 or NVRAM 203, the digital signature appended to RAM or NVRAM contents is then discarded. The inside of the NC client 101 is deemed to be tamper proof for the purposes of the NC client's security requirements, and therefore all digital signatures for the RAM or the NVRAM contents may be discarded once verified and the contents are written to the RAM 201 or NVRAM 203.

In the preferred embodiment, the ISP usage certificate is authenticated at the time that it is delivered from the relationship server 111 using the root public key; therefore, the ISP usage certificate need not be authenticated each time it is used if the integrity of the nonvolatile memory is trusted. However, step 1006 in NC flow chart 1 illustrates an optional step of authenticating the ISP usage certificate retrieved from nonvolatile memory 203 using the root public key retrieved from ROM 202 after the ISP usage certificate has been used to further protect against tampering with non-volatile memory, such as installing a certificate not signed by the root authority.

The root public key is typically written by the NC client device manufacturer at the time of manufacture and stands as the root authority for authentication and verification of signatures on the NC client device 101. If either of the authentications carried out in steps 1005 or 1006 fail, then either the smart card 102 contents or the ISP certificate are not valid, and therefore should not be used by the ISP to provide services. If the ISP usage certificate retrieved from the nonvolatile memory 203 is unsuccessfully authenticated, then the user is prompted at step 1042 in NC flow chart 8 for permission to reprogram the smart card 102. The user is also prompted for permission to reprogram the smart card 102 at step 1042 if the smart card 102 contents were unsuccessfully authenticated at step 1005. If the user grants such permission, then smart card 102 is reprogrammed at step 1043. When the smart card 102 contents corresponding to the ISP are reprogrammed at step 1043, it is written so as to contain only the ENTERPRISE_ID of the ISP. After reprogramming the smart card 102, the method proceeds to step 1007 in NC flow chart 2, at which the relationship server 111 is contacted.

However, assuming both cryptographic verifications at step 1005 and 1006 are carried out successfully, then the method continues to step 1023 on NC flow chart 5, where the NC client device 101 checks its RAM to determine if there is an Internet Access Provider (IAP) matrix corresponding to the ENTERPRISE_ID which was retrieved from the smart card 102. If there is no IAP matrix for the ISP designated by the smart card ENTERPRISE_ID, then the relationship server 111 must be contacted at step 1007 in NC flow chart 2 to provide the appropriate IAP connection information. However, if the IAP matrix corresponding to the ENTERPRISE_ID is found in a nonvolatile memory 203, then the method proceeds to step 1024, at which the local IAP Point of Presence (POP) telephone number that is in the IAP matrix within nonvolatile memory 203 is dialed by the NC client's modem.

At step 1025, the NC client 101 runs the dial-up script to connect to the ISP. Then at step 1026 the NC client 101 transmits its username/password pair to the IAP 105. The dial up script is run first, the script tells the NC client 101 what pieces to deliver to the IAP. For example, the dial up script tells the NC to dial the IAP phone number, then wait for the login prompt, feed the username, wait for the password prompt, then feed the password. If the NC successfully connects to the ISP at step 1027, then the user and the ISP interact as specified initially by the ISP at step 1028. However, if the connection between the NC and the ISP is not established, then the NC disconnects from the ISP and dials the relationship server 111 at step 1007. When a root authority (an NC client manufacturer or distributor) breaks a relationship with an ISP partner, the ISP 109 surrenders all managed access software according to the present invention, thereby rendering their "managed access" service useless. If an NC client manufacturer or distributor terminates an agreement with a partner ISP 109, then because the stale ISP access information is still held in the NVRAM 203 of the NC client 101, the NC client 101 will nonetheless attempt to connect to the defunct ISP service. The ability to disable the managed access software is necessary because an IAP matrix may be held in NVRAM 203 for a long period of time. Even if the NC client 101 is powered down for a long period of time, upon restarting the NC client 101 will load the stale IAP matrix from NVRAM 203 and attempt to connect to the unauthorized ISP. In this event, when the NC client 101 attempts to connect to the ISP 109, the connection fails and a call to the relationship server 111 is necessitated. If the manufacturer breaks a business agreement with an ISP, the managed access software used by the ISP is rendered ineffective by the relationship server 111 and connection between the NC and the ISP cannot be established. Under these circumstances, the NC is forced to dial the relationship server 111 so as to retrieve the connection information for a new ISP partner chosen by the NC client device manufacturer. This call to the relationship server 111 results in the initial data for a new ISP partner and associated IAP matrix being downloaded.

At step 1028 after the NC to ISP connection has been established, the initial Universal Resource Locator (URL) retrieved from the smart card 102 and the smart card serial number (if requested by the ISP) are transmitted to the ISP.

The branch at step 1028 illustrates that there are two separate procedures carried out by the ISP depending upon the state of the user's smart card 102. One procedure beginning at step 1029 of NC flow chart 6 corresponds to the registration of the user with the ISP; this branch is taken when the user's smart card 102 contains preliminary registration information written by the relationship server 111. The other branch beginning at step 1036 of NC flow chart 7 corresponds to the interaction between the ISP and the user after the user has been successfully registered. Therefore, a user ISP account has already been established, and the user's smart card 102 contains information written by the ISP. Therefore, branch G corresponds to ISP registration and branch H corresponds to ISP service provision. When the relationship server 111 had written the ISP initial URL smart card contents, the relationship server 111 did not provide any information which allowed the user to receive services from the ISP or to be billed by the ISP. The relationship server 111 had only provided enough information to contact the ISP registration URL and then once the initial connection to the initial URL is established, the ISP interacts with the user in the final steps of registration outlined in branch G.

These steps of user/ISP interaction, such as provision of a credit card number and establishment of a user password, are carried out at steps 1030. At step 1031, the ISP stops the registration if any of the user's information does not check, for example if the user provides an incorrect credit card number. However, assuming that all the user's data checks out, then the ISP proceeds to step 1032 at which point the NC client 101 receives ISP specific account data into the RAM 201 of the NC client device 101. This account information enables the user to obtain services from the ISP and to connect to the user's home URL established for the user by the ISP. This ISP specific account data must be cryptographically verified before it can be written to a smart card 102. Therefore, at step 1033, the ISP specific account information received into RAM 201 from the ISP is verified using the ISP usage certificate found in nonvolatile memory 203, which was provided by the relationship server 111. Assuming that this verification passes at step 1034, the ISP usage certificate in NVRAM 203 is optionally authenticated using the root public key found in read only memory 202. In the preferred embodiment, step 1034 is omitted because the ISP usage certificate was authenticated when it was received from the relationship server 111. If properly authenticated at step 1033, then the ISP specific account data is written onto the ISP's smart card 102 section at step 1035.

At step 1036 on NC flow chart 7, the smart card ISP specific account data is transmitted to the ISP, along with the smart card serial number and the NC model number. This information will have just previously been written by the ISP if user registration with the ISP has just occurred in branch G. This transmission to the ISP includes the user's home URL, so that the user will now be connected to his home service URL for the ISP. If at step 1037 some problem with the user's specific account data is detected, for example, if the user's credit card no longer is valid, the ISP prompts the user to call the registration number at step 1044. If the ISP determines at step 1037 that the NC client 101 needs a software patch in order to receive services, the ISP at step 1038 transmits the software patch and the NC client 101 receives it. If the NC client 101 does not need additional software, the method flows from step 1037 to step 1039 at which point the ISP facilitates interaction between the user and the ISP and provides services at step 1039. Although step 1039 is illustrated as a single box, it represents whatever complicated back and forth communication between the NC 101, smart card 102, and ISP that the user and ISP are willing to participate in based on their relationship. At some point the user will pull out his smart card 102; and when this is detected at step 1040, the NC disconnects from the ISP at step 1041 and returns to the starting point of the NC method at step 1001.

Whenever, for any one of a variety of reasons, the NC client 101 must contact the relationship server 111, the NC's method for handling this begins at NC flow chart 2. At step 1007, the NC client device 101 dials the relationship server 111 typically via a toll free call. The same relationship server telephone number is used for NCs manufactured by all manufacturers. The flow proceeds to step 1008 at which point the NC client 101 transmits its manufacturer identification number from its nonvolatile memory and the ENTERPRISE_ID, if it exists, from the smart card 102 to the relationship server 111. If the smart card 102 is blank, zero is sent as the ENTERPRISE_ID. At step 1009, if the relationship server 111 determines that the NC client 101 needs a software patch to execute the procedures to be carried out while connected to the relationship server 111, then the NC client 101 receives the software patch into its RAM from the relationship server 111 at step 1010. If no software patch is needed by the NC client 101, the flow proceeds to step 1011. The relationship server 111 at step 1011 determines where to proceed next.

If the ISP designated by the smart card ENTERPRISE_ID is not authorized by the manufacturer specified by the NC client manufacturer ID stored in NVRAM, then the relationship server 111 disconnects from the NC client 101, and the NC client 101 stops because the users ISP is not authorized by the client device manufacturer and the relationship server 111 has disconnected from the NC client 101. If the relationship server 111 determines based upon the manufacturer ID and the smart card ENTERPRISE_ID that managed access is required and that the manufacturer has authorized the ISP specified by the ENTERPRISE_ID, then the relationship server 111 transmits (and the NC client 101 receives) a matrix of connect information corresponding to all Internet Access Providers (IAPs) for each ISP authorized by the manufacturer into the NC client's RAM at step 1012. The information delivered to the NC at step 1012 includes a digital signature from the relationship server 111 as well as a certificate from the manufacturer specifying the relationship server's public key. The certificate is authenticated using the root public key, and the IAP matrices are verified using the relationship server's public key at step 1012.

If managed access is not required based upon the manufacturer identification number, then at step 1011 the relationship server 111 sends the NC client 101 a list of the top 20 ISPs and corresponding IAP matrices at step 1018, prompts the user for selection of one of those ISPs at step 1019. When the user makes his selection at step 1020, the NC client 101 writes the selected ISP as the smart card ENTERPRISE_ID at step 1021 and writes the smart card initial registration contents for the selected ISP at step 1022. In the nonmanaged access scenario described by branch D, there is no signature requirements on the initial registration contents written to the smart card 102. If the internet service provider selected wants to use digital signatures after registration has occurred, it can do so. After the smart card initial registration contents are written at step 1022 in the nonmanaged access case, the NC client 101 disconnects from the relationship server 111 at step 1017.

In the managed access case described by branch E, once the matrix of Internet Access Providers for each ISP is received into the NC client's RAM at step 1012, the smart card contents for the selected ISP are verified using an ISP usage certificate found in NVRAM 203. If the smart card contents pass the cryptographic verification of step 1013 then the NC client 101 disconnects from the relationship server 111 at step 1017. If the cryptographic verification fails at step 1013, then the NC client 101 receives an ISP certificate into NVRAM from the relationship server 111 at step 1014. The cryptographic verification at step 1013 will fail if the ISP usage certificate in the NC client's NVRAM 203 is stale or, in other words, is the certificate for another ISP other than the one specified by the smart card ENTERPRISE_ID. After the NC client 101 has received the ISP usage certificate into the NVRAM 203 at step 1014, the NC client 101 authenticates the, ISP usage certificate at step 1015 using the root public key found in ROM. If the NVRAM ISP usage certificate does not pass the verification in step 1015, then it is deleted from nonvolatile memory 203, and the NC client 101 stops. (Alternatively, the ISP usage certificate is received into RAM at step 1014, authenticated and written to NVRAM upon successful authentication at step 1015.)

If the authentication at step 1015 passes, the NC client 101 receives the initial registration contents for the ISP and writes them to the smart card 102 and at step 1016. The NC client 101 then disconnects from the relationship server 111 at step 1017 and the method progresses to step 1023 in NC flow chart 5. At step 1023, the NC again searches for an IAP matrix corresponding to the newly authorized ISP designated by the recently written smart card ENTERPRISE_ID.

According to the present invention, the ROM 202 in each NC client 101 contains the telephone number of the relationship server 111, 1-800-RELATIONSHIP. Upon initially booting up, each NC client 101 must call the relationship server 111 which will manage the NC client's access of the partner ISP 109. This implies that ROM cards 202 are country specific since 1-800 toll free numbers apply to only to the United States.

The relationship server 111 issues certificates binding the names of ISPs 109 and other entities to their corresponding public keys. For those ISPs that the root authority authorizes to connect to its NC clients, the root authority computes and appends its digital signature to the relationship server's ISP certificates. The root public key in each NC client's ROM 202 is therefore used to verify the root authority's authorization of the ISP. Certificates and signatures issued by any entities will be verifiable via a series of certificates leading back to the root authority. This handles the verification of certificates that were not issued directly by the root authority, as long as the certificate issuer can be traced back following a chain of issuer names to the root authority.

The relationship server 111 issues ISP name/public key certificates (signed by the relationship server 111) binding ISPs 109 and other entities to their associated public keys. In the presently preferred embodiment, standard X.509 v1 or v3 certificates are used. The contents of these certificates includes the certificate version number, serial number, validity period, relationship server name, ISP name, ISP public key, and relationship server signature portion. If X.509 v3 certificates are used, the user defined field can be used to provide a URL link to a web page controlled by the relationship server 111 containing a security policy statement covering the valid use of the certificate. The serial numbers of these ISP name/public key certificates issued by the relationship server 111 are sequential and are therefore unique for each ISP. According to the present invention, the serial number of the relationship server ISP name/public key certificate is the enterprise identification number (ENTERPRISE_ID) uniquely associated with the ISP.

The relationship server 111 delivers these ISP name/public key certificates to the various root authorities. If a root authority wishes to authorize usage of its NC clients to connect to the ISP 109 specified in an ISP name/public key certificate, then the root authority computes and appends its digital signature to the ISP name/public key certificate, thereby creating a root ISP certificate. Each root authority sends its root ISP certificates back to the relationship server 111. The relationship server 111 distributes these root ISP certificates to the NC clients of the root authority as will be described below.

The relationship server 111 maintains a database 112 which contains a list of all ISP names, ISP registration servers, and local POP (point of presence) telephone numbers. Because all NC clients 101 initially call the relationship server 111, the relationship server's database 112 must contain the details of all ISP registration servers and POP telephone numbers for all areas. For those ISPs that have multiple IAP partners, the relationship server's database 112 also holds call matrices which list all IAPs and corresponding POPs which provide access to the ISP.

The methods executed by the relationship server 111 according to the present invention are described in the relationship server flow charts 1 and 2. At step 2001, the NC dials the relationship server 111. At step 2002, the relationship server 111 accepts the connection from the NC. At step 2003, the relationship server 111 determines whether the not the NC client 101 needs a software patch in order to continue. If so, the relationship server 111 transmits the software patch at step 2004. If there is no need for a software patch, then the relationship server 111 proceeds to step 2005 at which it receives the NC manufacturer identification number and the ENTERPRISE_ID (if it exists). If no ENTERPRISE_ID exists on the smart card 102 inserted into the NC client 101, the relationship server receives an ENTERPRISE_ID of zero. The relationship server 111 uses the manufacturer identification number and the enterprise identification number to access the relationship server database 112 at step 2006 so as to determine whether or not managed access is required at step 2007.

If the manufacturer specified by the manufacturer identification number does not place limits on which ISPs to which its NCs can be used to connect, then managed access is not required and the relationship server 111 transmits the top 20 ISPs and corresponding IAP matrices that are found in the relationship server database 112 at step 2015. Then the relationship server 111 disconnects from the NC at step 2014 and then stops.

However, if at step 2007 the relationship server database 112 indicates that managed access is required, then the relationship server 111 proceeds to step 2008, where the relationship server 111 checks its database 112 to determine whether or not the manufacturer has authorized connection of the NC client device 101 to the specific ENTERPRISE_ID transmitted to the relationship server 111. If the ISP is not authorized by the manufacturer, the relationship server 111 disconnects from the NC at step 2014 and stops. However, if the manufacturer has authorized the ISP, then the relationship server 111 then transmits the matrix of IAPs corresponding to all ISPs authorized by the manufacturer at step 2009.

If the NC at step 2010 in relationship server flow chart 2 indicates that it needs an ISP certificate for the ISP corresponding to the ENTERPRISE_ID, then the relationship server 111 transmits the ISP usage certificate at step 2011. At step 2012, if the NC determines that it needs initial registration contents for the ISP, then those contents are transmitted at step 2013 to the NC client 101 by the relationship server 111. In any of these cases, the relationship server 111 then disconnects from the NC at step 2014 and stops.

According to the present invention, strong cryptographic authentication of an ISP 109 is required before allowing the ISP 109 to update the contents of the smart card 102. In the presently preferred implementation, this is performed using standard SSL (secure sockets layer). The requirement that the ISP 109 compute and append a digital signature to the data it is writing to the smart card 102 is accomplished using non-proprietary protocols and software existent at both the NC client 101 and the ISP 109 ends.

According to the present invention, the addition of strong authentication to the NC client 101 does not require the storage of private keys and accompanying processing resources on the smart card 102. The NC client 101 architecture according to the present invention requires only the verification of digital signatures, but does not require the generation of the NC client's own digital signatures; and therefore only requires the storage of public keys on the NC client 101.

The IAP/ISP flow charts 1 and 2 describe the anticipated way that a typical IAP 105 and ISP will register a user and then will interact with the user once registered. When the NC client device 101 dials a local IAP telephone number at step 3001, the IAP 105 receives a username/password at step 3002 necessary to gain access to the internet through the IAP 105.

According to an embodiment of the present invention, the username/password pairs required to log on to the ISP 109 are written to NVRAM 203 or RAM 201. Alternatively, according to the present invention, the NC client 101 supports an IAP matrix that is split between client device memory (NVRAM 203 and RAM 201) and the smart card 102. In the preferred embodiment of the present invention, the entire contents of the IAP matrix is placed in NVRAM 203 or RAM 201. This preferred embodiment has the advantage that only ISP information is written to the smart card 102; therefore, no IAP information is written to the smart card 102. In this preferred embodiment, the username/password combinations are associated with specific telephone numbers. For example, if a user with an NC client 101 in his home has local POPs stored in the NVRAM 203 of his NC client 101 went from IAP A went across country and used an NC client 101 with POPs for IAP B, no call to the relationship server 111 is necessary because the NC is already fully enabled to connect to the IAP B.

At step 3003, the URL transmitted to the IAP 105 by the NC client 101 from the smart card 102 will connect the NC either to the user's home page or to the ISP registration page. If the smart card URL was written by the relationship server 111, the user has only completed the first phase of registration and must still register with the ISP. In this case, the smart card URL will specify a connection to the ISP registration page. However, if the smart card URL specifies a connection through the IAP 105 to the user's home page, then the user has already performed both phases of registration.

According to another aspect of the present invention, the smart card 102 includes a serial number which is readable by the ISP 109. When the ISP initial URL must include the smart card serial number, the NC client 101 appends the smart card serial number to the end of the URL. If the manufacturer's serial number is needed in the ISP initial URL, the NC client 101 appends its unique serial number to the URL stored in the NC client's NVRAM 203.

The smart card serial number can be used by the ISP 109 to authenticate or audit the initial URL connection to the ISP 109. The ISP 109 can also use techniques to append information to the end of the URL that it downloads to the smart card 102. In other words, when the ISP registration system creates the initial URL, the ISP 109 could create an initial URL such as the following:

http:/server/cgi-bin/login.cgi?username=BOB&password=RANDOM

The NC client 101 issues this initial URL to cause a connection to the the ISP's registration web page that may used to register and authenticate the user. No requirement is placed on the form of the initial URL issued by the relationship server 111 by managed access software according to the present invention. The ISP 109 has a great deal of flexibility as to how it operates the NC client 101. The NC client 101 determines how to operate based partially upon the contents of the smart card 102. For example, if the ISP 109 wants NFS to be used for booting, a dedicated tag is allocated and assigned the value "nfs" on the smart card 102. Other types of file systems can be used by assigning different values to the allocated tag. The managed access software according to the present invention does not mandate the type of file system that the NC client 101 must use. The ISP 109 makes the choice of the file system based on the types of file systems supported by the NC clients that the ISP 109 wants to support. Therefore, the ISP 109 may be required to support more than one file system protocol if it is interested in supporting NC clients from various manufactures that do not all support any single common file system type.

If the registration URL has been sent to the IAP 105, then the ISP interacts with the user at step 3004 to establish credit card billing and account data as provided for in the ISP registration page, and to establish a user password, if desired. At step 3005, the ISP determines whether the user's credit card is valid. If not, it stops. If the credit card is valid at step 3006, the ISP creates user specific account data such as account balances, ISP usage credits of various types which will vary from ISP to ISP. At step 3007, the ISP creates a digital signature of the user's specific account data using the ISP's private key. At step 3008, the ISP transmits to the NC client 101 the user specific account data along with its digital signature to the NC.

After registration, the ISP transfers the user to his home URL, which was included in the user specific account data and validates the user at step 3009 in IAP/ISP flowchart 2 using the password established for the user during registration at step 3004. If this authentication of the user fails, then the ISP transmits a command to the NC to prompt the user to call the ISP's registration number at step 3013. If the validation passes, then at step 3010 the ISP determines whether or not the NC needs a software patch to interact with the ISP at step 3010. If no software patch is needed, then the ISP interacts with the user at step 3012. If a patch is needed, then the ISP transmits it at step 3011 before interacting with the user at step 3012.

FIG. 15 illustrates some of the preferred contents of the various memory devices associated with an NC, and also shows which entities are intended to write the various contents in the various fields. The relationship server telephone number and manufacturer serial number in NVRAM are written by the manufacturer, as indicated by the "M" characters in the field 1501. All other fields of the NVRAM are written by the relationship server 111, as indicated by the "RS" characters in the field 1501. The IAP matrices in RAM corresponding to all ISPs is written by the relationship server 111, as indicated in the "RS" in field 1502. Obviously, the RAM also includes various transient program code and data (not shown) written by the NC and the ISP as well. The root authority public key in ROM is hard-coded, and is not writeable by any entities, as indicated by the "*" in the field 1503. The smart card ENTERPRISE_ID may either be written by the relationship server 111 or may be hard-coded, as indicated by the "RS,*" shown in the field 1504. The other smart card variables may be written by the relationship server 111 or the ISP, as indicated by the "RS, ISP" in the field 1504.

The managed access system according to the present invention accommodates several different alternatives for handling ISP connectivity. According to one alternative, the smart card 102 supports multiple access points for each ISP in the form of an array of POP or IAP telephone numbers for each ISP 109. According to another alternative, it supports separating the IAP information between the smart card 102 and NVRAM/RAM. In particular, the username/password pair is placed on the smart card 102, and the rest of the IAP matrix is placed into NVRAM 203. In the preferred embodiment, both the username/password pair and the rest of the IAP matrix are placed into NVRAM 203. The smart card contents are digitally signed to protect the ISP clients and NC device manufacture.

The NC device uses a certificate based algorithm to verify the writer of the smart card contents before using the information on the smart card 102. According to the present invention, the ISP 109 is permitted to write the information on the smart card 102 that it controls and the relationship server 111 is permitted to write information to the NVRAM 203 that enables the NC client 101 to verify the ISP 109. The relationship server 111 initially stores on the smart card 102 the initial ISP registration URL and the NFS/CSFS mount point. The relationship server 111 writes the root ISP certificate to NVRAM 203. This initial connect information was provided by the root authority to the relationship server 111 and is signed by the root authority. Before allowing this initial connect information to be stored onto the smart card 102, the NC client 101 authenticates the origin of the initial connect information using the root public key stored in ROM 202 to authenticate the root signature on the initial connect information. Before allowing the ISP 109 to write account information onto the smart card 102, the NC client 101 authenticates the ISP's signature appended to the account information using the ISP public key found in the ISP certificate in NVRAM 203 and authenticates the ISP public key by verifying the root signature on the ISP certificate using the root public key found in its ROM 202. After such authentication, the ISP 109 is permitted to rewrite the ISP URL and the NFS/CSFS mount point information. The ISP 109 may rewrite this connect information after the user has successfully registered with the ISP's registration system.

All data on the smart card 102 is written including the digital signature of the author of the data, so that the data's integrity can be verified. The combination of the telephonic dial-up process and the standard usage of strong authentication insures that only the relationship server 111 and the ISP 109 are writing to the smart card 102. However, in order to allow this updating of critical information on the smart card 102 by other parties we require strong authentication of these entities. According to the present invention, this is accomplished using existing standard strong authentication mechanisms from the ISP 109 to the NC client 101. For example, Secure Sockets Layer (SSL) version 3.0 using RSA certificates is preferably used for authentication. The NC client 101 holds in ROM 202 a root certificate. The ISP 109 authenticates itself to the NC client 101; however, the NC client 101 does not authenticate itself to the ISP. Because the NC client 101 does not add a digital signature to anything, it does not need to store and private keys. The NC client 101 is authenticated by virtue of the username/password pair that the ISP 109 may require for logging on to the ISP 109.

The boot block employees a Type Length Value (TLV) semantics. Each entry contains a four byte type indicator, a two byte length indicator and a value. All data is stored in big-endian format. The boot block is a collection of files of a given size. The given sizes for each file is the same but not necessarily the same for each smart card 102. In other words, one smart card 102 may have all 440 byte files and another may have 800 byte files. It is not necessary to specify the exact file size of an NC smart card 102 since this version of the boot block structure does not rely on a fixed file size. However, the structure of the directory is fixed. There is one index file that contains information to rest of the directory structure. Each smart card 102 supports the ability to read the file sizes and names from the cards. The NC client 101 is expected to use this information to determine the directory structure. While the file sizes are not fixed, there are file sizes that are initially more efficient then others and should make for a better choice; however, in the future these values may change.

A smart card 102 can hold one or more enterprise contents. An enterprise contents is the information for a particular ISP or corporate client. A unique ENTERPRISE_ID is associated with every enterprise contents. Therefore, the smart card 102 can be broken into individual enterprise contents each labeled by an ENTERPRISE_ID. An optional enterprise offset structure is held in the index file. An enterprise offset structure is used to quickly determine the ENTERPRISE_IDs found on the smart card 102. This is useful if more then one ISP is written to the smart card 102. By reading the enterprise offset structure, the client can quickly give the user the choice of which ISP he wants to use and the offset to where that ISP's boot block information is located. If enterprise offsets are not present, it can be assumed that only one ENTERPRISE_ID is located on the smart card 102. In the consumer market, this may prove to be very useful when multiple ISPs are common.

The interpretation of the value is dependent upon the tag identifier. If the high bit of the first tag identifier byte is set, it indicates that the field is an "aggregate". Aggregate values consist of zero or more nested tagged field values with the same structure as above. This provides a mechanism for representing nested data types. The tag identifier of the outer nest environment defines the meaning of the inner tag identifiers. The inner tags may represent the either individual elements of an array, a sequence, or a set: that determination is left up to the individual applications.

Without the entire IAP matrix in NVRAM/RAM the smart card 102 would look like:

```
<BeginSignatureTag><len until signature tag>
<EnterpriseIDTag><4><num>
<AuthenticationUserNameTag><len><username>
<AuthenticationPasswordTag><len><passwd>
<ServerNameTag><len><nfs server>
<UserMountPointTag><len><rw mount>
<URLTag><len><url>
```

-continued

```
<ProxyTag><len><proxy ip>
<SignatureTag><len><long num>
```

The signature is enclosed by an BeginSignature tag and ended when the SignatureTag is reached. Everything except for the possible enterprise certificate is ignored outside of the signature tag. In other words, if the data is not surrounded by a signature it is considered garbage. The signature is formed from hashing the entire contents, with the obvious exception of the signature. The enterprise certificate is not stored on the smart card 102 when used with Managed Access.

A notable tag is the BlankSpaceTag tag. This tag is useful to allocate free space to allow growth in a given ENTERPRISE_ID before the next one starts. For example, to leave room for another IAP one would use:

<BlankSpace>.<length><space>

Since the POP phone numbers, enterprise certificate, and other information can be either in RAM/NVRAM or on the smart card 102, it is important that the NC client 101 determines the appropriate action to take and finds the information in the appropriate place. If Managed Access is required by the NC Client hardware, the NC Client software must make sure an ENTERPRISE_ID matrix is stored in RAM/NVRAM. However, if Managed Access is not required, information on the smart card 102 is used in preference to the information in RAM/NVRAM.

If a value extends pass the end of a file, it continues into the next boot block file. In other words, if a signature is 550 bytes and the boot block files are only 440 bytes, the signature will extend to the next boot block file.

The contents stored in NVRAM/RAM are not specified or mandated according to the present invention since each NC client software ventor or manufacturer can determine its contents and access methods independently. No requirement is placed on the format of the RAM/NVRAM since the manufacturer's OS is free to read and write this information in anyway it finds most convenient; however, the format used to download these contents is standardized. A canonical form understood by both the downloading server and NC client 101 is necessary because the downloading server creates both smart card content packets as well as NVRAM/RAM content packets. For simplicity, the same format for both destinations (smart card 102 and NVRAM/RAM) is preferably used.

When the downloading server creates the contents that it wants to write to the client, it uses a special MIME type to download the packet into the NC client 101. The MIME type is called content_type: application/nc-smart card. A blank line followed by TLV formatted data follows. The first (optional) tag indicates the server status and indicates the contents that follow. The RAMContentTag or Smart card-ContentTag indicates the destination of the accompanying data.

Following the contents are two URLs used by the client to go to the next HTML page. A URL indicating successful completion is provided as well as one indicating an error. For example:

```
DONE_URL=<URL used for successfully completion>
ERROR URL=<URL used for some kind of error>
DONE_URL=http://my-registration-server/cgi-bin/register.cgi?done?username
ERROR_URL=http://my-registration-server/cgi-bin/register.cgi?error?username
```

For multiple ENTERPRISE_IDs (i.e. more than one ISP is downloaded), the EnterpriseMaxtixTag is used. However, the signatures are executed over individual ENTERPRISE_IDs and does not include the EnterpriseMatrixTag or contents. While the NC client 101 does not store and revalidate the signature for the NVRAM/RAM contents, they are required so the NC verifies that it is talking to an appropriate service that is allowed to write to it. Note, even though augmenting the NVRAM would not result in abuse of the NC box, denial of service could result as a result of HTML pages downloaded misinformation to NVRAM/RAM.

The NC client 101 is responsible for piecing the necessary parameters from NVRAM and the smart card 102 into a useful form that it can operate on. In other words, the IAP matrix as a whole is useful to keep together but it may come in pieces (e.g. username/password pairs from the smart card 102 and the rest from NVRAM). No requirements are made on this form according to the present invention.

The contents that are downloaded depend on the type of server the data is used on. In other words, the ISP for which the smart card 102 contents are created determines, in conjunction with the type of NC client 101, what tags are required. The ISP will decide which type of file system is being used, for example.

When the client detects a need to call the relationship server 111, it passes the manufacturer's serial number to the relationship server 111 and the ENTERPRISE_ID once it establishes the connection. If the NC client 101 is calling the relationship server 111 for the first time, it uses ENTERPRISE_ID zero. Thus the packet sent by the client to the relationship server 111 looks like:

```
<ManufacturerIDTag><len><xx.xx. . .xxxxxxxx>
<EnterpriseIDTag><4><0>
```

The relationship server 111 then takes the manufacturer serial number and looks up the supported ISPs for the NC client 101. If it already has an ENTERPRISE_ID stored on the smart card 102 but needs updated RAM contents, it supplies the ENTERPRISE_ID found on the smart card 102. If more then one ISP is available, the relationship server 111 downloads the full contents for both NVRAM and the smart card 102 in its packet, The relationship server 111 packages the multiple ISPs using the EnterpriseMatrixTag. Once the packet is received by the client, the NC client 101 can disconnect from the relationship server 111.

When the smart card 102 is blank, the NC client 101 determines which ISP to write to the smart card 102 and NVRAM. If only one ISP is down loaded, it simply writes the one available ISP to the smart card 102 and NVRAM. If the NC client 101 cannot write all of the available ISPs to the smart card 102, it must prompt the user to choose which ISP he/she wants to use. The chosen ISP is written to the smart card 102 and corresponding NVRAM contents is written to NVRAM. The packet received for NVRAM is also signed by the relationship server 111, and although the signature is not stored by the NC client 101, it is verified using the relationship server's public key before writing.

If the smart card 102 is not blank, the NC client 101 determines for which ISPs it must write the corresponding RAM contents to NVRAM. If none is available, an error should be returned to the user. Since the NC client 101 does not know what time zone it is in, the relationship server 111 will download date, time, and time zone information. This way, the rules, which are based on time, can be applied correctly. This implies that the relationship server 111 must relate time zones with area codes. Because through user prompting or A&I services, the relationship server 111 locates the relative location of the NC client 101, it can easily store the time zone of all the possible locations in the database 112. An example of the date, time, and time zone formats is as follows:

```
<DateTag><10><YYYY:MM:DD><TimeTag><HH:MM:SS>
<TimeZoneTag><2><zone number>
```

Every time the client receives a packet to write to the smart card 102, it updates the index file with ENTERPRISED_ID(s) written to the smart card 102 and their offsets. Furthermore, the NC client 101 writes the version number to the index file. This is not known or dealt with by the registration server or relationship server 111; it is completely handled by the client. An enterprise signature is created by performing a secure hash on the enterprise contents and encrypting it with the enterprise private key.

Rules give a time range for the use of an IAP 105 found in an IAP matrix. The format of the rule gives the high and low range for the time in which an IAP 105 should be used. For example, <RuleTimeTag><4><1200,1700>—means 12 pm to 5 pm. Phone numbers are stored in an ASCII string. For example:
<POPPhoneNumberTag><7><6314100>:

The manufacture's identification number is preferably stored in NVRAM. It is a composite of many different parts of the NC client 101 including: BIOS number, NC client number, and manufacture's identification number.

The parts consist of:

| | |
|---|---|
| serial number version | 8 bits |
| serial number type | 8 bits |
| manufacture id | 16 bits |
| model number | 16 bits |
| BIOS version | 32 bits |
| NCOS version | 32 bits |
| serial number | variable size |

The serial number version is simply the version of the format of the serial number itself. The serial number type is defined to be the type of the variable length portion of the serial number. For example, the variable length serial number could be derived from the Ethernet MAC address, a manufacturer assigned number, a Dallas chip assigned number, or assigned by the managed access software author. The manufacture identification number is a number assigned by the managed access software author for each manufacture of an NC badged network computer. The model number is assigned by the manufacturer of the NC hardware platform. A model number represents the hardware configuration of the NC. The BIOS and NCOS version numbers are assigned by the managed access software author and are in the form of major.minor.patch.port where each component is 8 bits. The serial number is a variable length number designed by the manufacturer. It is variable length because the contents are not mandated.

To compose a serial number, the NC client software must combine pieces found in various places. The serial number version, serial number type, manufacture id, BIOS version and model number are placed into the ROM. The NCOS version number is put into the NCOS itself. Of course, this might also be in ROM or it maybe downloaded. The location variable length serial number depends on the type. If it is provided by the manufacturer, it is burned into NVRAM.

When transmitted in string form, each part is represented in a hexadecimal number separated by a dot. For example, 01.03.0001.0001.01030101.01030101.00000001

The alternative 1-800 number is used as a replacement for the 1-800-relationship server number found in ROM. It can either be stored in ROM, downloaded, or initialized on a new smart card 102. Like other contents, the alternative 1-800 number must be signed. Therefore, it is proceeded by BeginSignatureTag and followed by a SignatureTag. It is signed by the private key used in conjunction with the public key stored in ROM. This is either the manufacturer private key or the trusted authority's private key depending on what public key is stored in ROM.

The alternative relationship number is stored in a boot block. The offset tag in the index file determines which boot block the alternative relationship number is stored. The index file holds the version number and an optional enterprise group tag. The EnterpriseGroupTag lists which enterprises are on the card and the offsets upon which to find them. This can be very useful when multiple ISPs are stored on one smart card 102. The version number is written by the NC client 101 when it is initially written with contents. This implies that the manufacturer of the smart card 102 only needs to burn the serial number and boot block directory structure. The contents of the boot blocks are intially empty.

While the present invention has been described with reference to its preferred and alternative embodiments, those embodiments are offered by way of example, not by way of limitation. The foregoing detailed description of the invention has been presented for purposes of illustration and description. It is not intended to be exhaustive or to limit the invention to the precise form disclosed, and obviously many modifications and variations are possible in light of the above teaching. The described embodiment was chosen in order to best explain the principles of the invention and its practical application to thereby enable others skilled in the art to best utilize the invention in various embodiments and with various modifications as are suited to the particular use contemplated. Those skilled in the art will be enabled by this disclosure to make various obvious additions or modifications to the the embodiments described herein; those additions and modifications are deemed to lie within the scope of the present invention. It is intended that the scope of the invention be defined by the claims appended hereto.

What is claimed is:

1. A method for connecting a network computer client device (NC) to an internet service provider (ISP), the method comprising the steps of:
   (a) dialing a relationship server;
   (b) transmitting an NC manufacturer identification number to the relationship server corresponding to an NC manufacturer of the NC;
   (c) receiving an authorized usage certificate for the ISP from the relationship server that includes a manufacturer's digital signature;
   (d) performing a cryptographic verification of the authorized usage certificate for the ISP using an NC root public key; and
   (e) connecting to the ISP if step (d) is successful.

2. A method as in claim 1, further comprising the step of: after step (a) and before step (c),
   (f) transmitting an enterprise identification number from a smart card inserted into the NC corresponding to the ISP to the relationship server.

3. A method as in claim 1, further comprising the step of: before step (a),
   (g) performing a cryptographic verification of a stale authorized usage certificate for an unauthorized ISP using the NC root public key;
   (h) attempting to connect to the unauthorized ISP; and
   (i) if step (h) is unsuccessful, proceeding to step (a).

4. A method as in claim 3,
   wherein step (g) includes the step of reading the stale authorized usage certificate from a non-volatile memory within the NC;
   wherein step (c) includes the step of writing the authorized usage certificate to the non-volatile memory within the NC; and
   wherein step (d) includes the step of reading the authorized usage certificate from the non-volatile memory within the NC.

5. A method as in claim 1,
   wherein step (d) includes the step of reading the NC root public key from a read only memory.

6. A method as in claim 4,
   wherein step (a) includes the step of reading a relationship server telephone number from the non-volatile memory.

7. A method as in claim 5,
   wherein step (b) includes the step of reading a manufacturer serial number from the non-volatile memory.

8. A method as in claim 1, further comprising the step of: after step (b) and before step (e),
   (j) receiving an ISP list of all enterprise identification numbers corresponding to all internet service providers authorized by the NC manufacturer from the relationship server.

9. A method as in claim 8, further comprising the step of: after step (b) and before step (e),
   (k) receiving an internet access provider connect matrix for each enterprise identification number in the ISP list from the relationship server.

10. A method as in claim 8, further comprising the step of: after step (j) and before step (c),
    (l) receiving an ISP selection from an NC user indicating which internet service provider from the ISP list to which to attempt connection.

11. A computer readable storage medium comprising:
    computer readable program code embodied on said computer readable storage medium, said computer readable program code for programming a computer to perform a method for connecting said computer (NC) to an internet service provider (ISP), the method comprising the steps of:
    (a) dialing a relationship server;
    (b) transmitting an NC manufacturer identification number to the relationship server corresponding to an NC manufacturer of the NC;
    (c) receiving an authorized usage certificate for the ISP from the relationship server that includes a manufacturer's digital signature;

(d) performing a cryptographic verification of the authorized usage certificate for the ISP using an NC root public key; and (e) connecting to the ISP if step (d) is successful.

12. A computer readable storage medium comprising computer readable program code as in claim 11, further comprising the step of:

after step (a) and before step (c), (f) transmitting an enterprise identification number from a smart card inserted into the NC corresponding to the ISP to the relationship server.

13. A computer readable storage medium comprising computer readable program code as in claim 11, further comprising the step of:

before step (a), (g) performing a cryptographic verification of a stale authorized usage certificate for an unauthorized ISP using the NC root public key;

(h) attempting to connect to the unauthorized ISP; and (i) if step (h) is unsuccessful, proceeding to step (a).

14. A computer readable storage medium comprising computer readable program code as in claim 13, wherein step (g) includes the step of reading the stale authorized usage certificate from a non-volatile memory within the NC;

wherein step (c) includes the step of writing the authorized usage certificate to the non-volatile memory within the NC; and wherein step (d) includes the step of reading the authorized usage certificate from the non-volatile memory within the NC.

15. A computer readable storage medium comprising computer readable program code as in claim 11, wherein step (d) includes the step of reading the NC root public key from a read only memory.

16. A computer readable storage medium comprising computer readable program code as in claim 14, wherein step (a) includes the step of reading a relationship server telephone number from the non-volatile memory.

17. A computer readable storage medium comprising computer readable program code as in claim 15, wherein step (b) includes the step of reading a manufacturer serial number from the non-volatile memory.

18. A computer readable storage medium comprising computer readable program code as in claim 11, further comprising the step of:

after step (b) and before step (e), (j) receiving an ISP list of all enterprise identification numbers corresponding to all internet service providers authorized by the NC manufacturer from the relationship server.

19. A computer readable storage medium comprising computer readable program code as in claim 18, further comprising the step of:

after step (b) and before step (e), (k) receiving an internet access provider connect matrix for each enterprise identification number in the ISP list from the relationship server.

20. A computer readable storage medium comprising computer readable program code as in claim 18, further comprising the step of:

after step (j) and before step (c), (l) receiving an ISP selection from an NC user indicating which internet service provider from the ISP list to which to attempt connection.

21. An apparatus for connecting a network computer client device (NC) to an internet service provider (ISP), the apparatus comprising:

(a) means for dialing a relationship server;

(b) means for transmitting an NC manufacturer identification number to the relationship server corresponding to an NC manufacturer of the NC;

(c) means for receiving an authorized usage certificate for the ISP from the relationship server that includes a manufacturer's digital signature;

(d) means for performing a cryptographic verification of the authorized usage certificate for the ISP using an NC root public key; and (e) means for connecting to the ISP responsive to means (d).

22. An apparatus as in claim 21, further comprising:

(f) means for transmitting an enterprise identification number from a smart card inserted into the NC corresponding to the ISP to the relationship server.

23. An apparatus as in claim 21, further comprising the step of:

(g) means for performing a cryptographic verification of a stale authorized usage certificate for an unauthorized ISP using the NC root public key;

(h) means for attempting to connect to the unauthorized ISP; and (i) means for invoking means (a) responsive to means (h).

24. An apparatus as in claim 23, wherein means (g) includes means for reading the stale authorized usage certificate from a non-volatile memory within the NC;

wherein means (c) includes means for writing the authorized usage certificate to the non-volatile memory within the NC; and wherein means (d) includes means for reading the authorized usage certificate from the non-volatile memory within the NC.

25. An apparatus as in claim 21, wherein means (d) includes means for reading the NC root public key from a read only memory.

26. An apparatus as in claim 24, wherein means (a) includes means for reading a relationship server telephone number from the non-volatile memory.

27. An apparatus as in claim 25, wherein means (b) includes means for reading a manufacturer serial number from the non-volatile memory.

28. An apparatus as in claim 21, further comprising:

(j) means for receiving an ISP list of all enterprise identification numbers corresponding to all internet service providers authorized by the NC manufacturer from the relationship server.

29. An apparatus as in claim 28, further comprising:

(k) means for receiving an internet access provider connect matrix for each enterprise identification number in the ISP list from the relationship server.

30. An apparatus as in claim 28, further comprising the step of:

(l) means for receiving an ISP selection from an NC user indicating which internet service provider from the ISP list to which to attempt connection.

* * * * *